(12) United States Patent
Khsib

(10) Patent No.: US 11,671,604 B1
(45) Date of Patent: Jun. 6, 2023

(54) CONTENT AWARE UNIFORM QUALITY FOR QUALITY-DEFINED VARIABLE BITRATE ENCODING OF VIDEOS

(71) Applicant: Amazon Technologies, Inc., Seattle, WA (US)

(72) Inventor: Ramzi Khsib, Coquitlam (CA)

(73) Assignee: Amazon Technologies, Inc., Seattle, WA (US)

( * ) Notice: Subject to any disclaimer, the term of this patent is extended or adjusted under 35 U.S.C. 154(b) by 162 days.

(21) Appl. No.: 17/116,833

(22) Filed: Dec. 9, 2020

(51) Int. Cl.
| | |
|---|---|
| *H04N 19/154* | (2014.01) |
| *H04N 19/136* | (2014.01) |
| *H04N 19/124* | (2014.01) |
| *H04N 19/162* | (2014.01) |
| *G06N 5/04* | (2023.01) |
| *H04N 19/50* | (2014.01) |
| *H04N 19/184* | (2014.01) |
| *G06N 20/00* | (2019.01) |
| *H04N 19/172* | (2014.01) |

(52) U.S. Cl.
CPC .............. *H04N 19/154* (2014.11); *G06N 5/04* (2013.01); *G06N 20/00* (2019.01); *H04N 19/124* (2014.11); *H04N 19/136* (2014.11); *H04N 19/162* (2014.11); *H04N 19/172* (2014.11); *H04N 19/184* (2014.11); *H04N 19/50* (2014.11)

(58) Field of Classification Search
CPC .. H04N 19/172; H04N 19/162; H04N 19/136; H04N 19/124; H04N 19/154
USPC ...................................................... 375/240.03
See application file for complete search history.

(56) References Cited

U.S. PATENT DOCUMENTS

2014/0215017 A1* 7/2014 Yeh .................... H04L 65/80
709/219

* cited by examiner

*Primary Examiner* — On S Mung
(74) *Attorney, Agent, or Firm* — Nicholson De Vos Webster & Elliott LLP

(57) ABSTRACT

Techniques for providing content aware uniform quality for quality-defined variable bitrate encoding of videos are described. According to some embodiments, a computer-implemented method includes receiving a request at a content delivery service to encode a live video at a quality level of a plurality of quality levels of a quality-defined variable bitrate encoding, determining features for a frame of the live video, generating a first predicted quantization parameter for the frame by a first machine learning model, trained for a first objective quality metric, receiving an input of the features and the quality level, performing a real time encode of the live video based at least in part on the first predicted quantization parameter to generate an encoded live video, and transmitting the encoded live video to a viewer device.

20 Claims, 18 Drawing Sheets

CONTENT AWARE UNIFORM QUALITY FOR QUALITY-DEFINED VARIABLE BITRATE ENCODING OF VIDEOS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various embodiments in accordance with the present disclosure will be described with reference to the following drawings.

DETAILED DESCRIPTION

Figure 1:
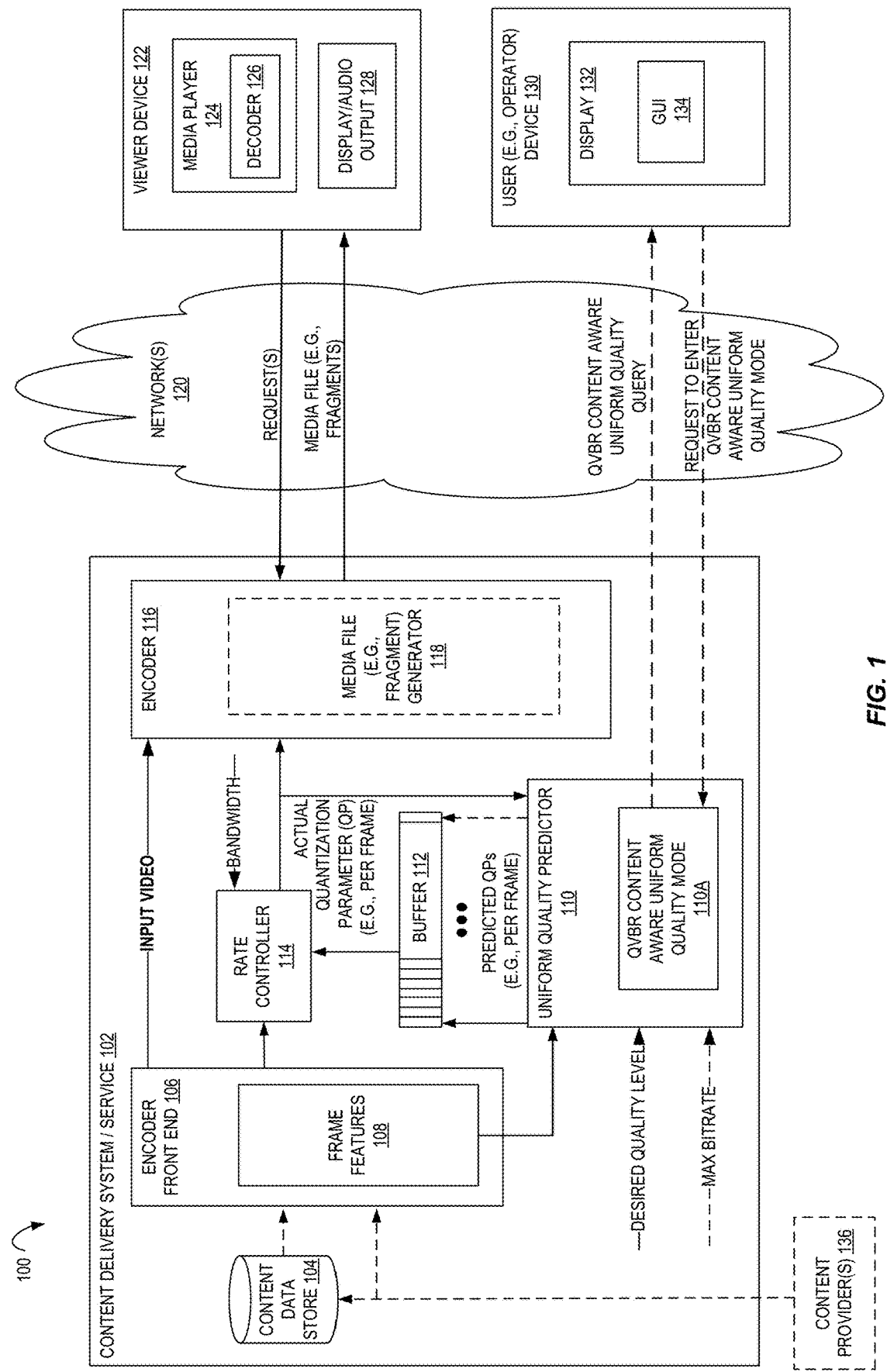
FIG. 1 is a diagram illustrating an environment including a content delivery system having a uniform quality predictor to predict one or more quantization parameters and an encoder to encode a media file according to the one or more predicted quantization parameters according to some embodiments.

The present disclosure relates to methods, apparatus, systems, and non-transitory computer-readable storage media for the content aware uniform quality for quality-defined variable bitrate (QVBR) encoding of videos. To address the shortcomings of a constant bitrate (CBR) and other variable bitrate (VBR) rate control modes, certain embodiments herein perform quality-defined variable bitrate (QVBR) encoding, e.g., as a content-conscious version of VBR bitrate control. In certain embodiments, QVBR encoding analyzes every macroblock, frame, and/or scene in a source video, and automatically allocates bits to address information differences, e.g., higher bitrate use during complex video segments and lower bitrate use during less complex video segments. In certain embodiments, QVBR is an enhanced version of variable bitrate control that minimizes wasted bits and scales video bitrate to maintain consistent video quality. Embodiments of QVBR encoding achieve significant bitrate savings (e.g., up to 50%) in comparison to constant bitrate (CBR) and other variable bitrate (VBR) rate control encoding.

For example, for a rate quality graph of bitrate (on the x-axis) versus a quality metric (on the y-axis), the rate quality plots may be different for different videos. For example, where the quality metric is a subjective quality metric (e.g., determined by a human) and/or an objective quality metric (e.g., determined by a machine), e.g., peak signal-to-noise ratio, structural similarity index measure (SSIM) (e.g., multi-scale SSIM (MS-SSIM)), Video Multimethod Assessment Fusion (VMAF), etc. An objective quality metric may be a full reference objective quality metric (for example, generated by comparing the original video (e.g., features) against the encoded video (e.g., features)), a reduced reference objective quality metric (for example, generated by comparing a proper subset of features of the original video against a proper subset of features of the encoded video), or a no-reference objective quality metric (for example, generated without any reference to the original video (e.g., features)).

For a given quality level (e.g., on a scale of 0 or 1 to 100) it is a straightforward to understand that different videos may achieve the same desired quality (e.g., as indicated by a quality metric) at different bitrates. In certain (e.g., CBR) designs, the highest of those different bitrates is selected for all videos even though that is a bandwidth waste for the other of those bitrates. Embodiments herein use QVBR encoding to analyze each video, and automatically allocate bits to address information differences, e.g., higher bitrate use during complex video segments and lower bitrate use during less complex video segments.

However, for a defined quality level of a plurality of selectable quality levels of a QVBR encoding process, the perceived quality is not equalized among all the content in certain embodiments, e.g., where there are noticeable variations in the visual quality. These variations constitute a visual annoyance as they diminish the viewing experience. Embodiments herein make the output quality for QVBR encoding be constant for a user defined quality level. For example, where the QVBR quality level is selectable between a range (e.g., 1-10) that controls the target quality for the video encode, e.g., applying only when a rate control mode is set to "QVBR". In one embodiment, a user sets a value for QVBR quality level (e.g., and a maximum bitrate), e.g., to target the most important viewing devices. For example, setting QVBR to a higher quality level (e.g., 8 to 10) for a primary screen (e.g., television) type of viewing device (e.g., with a maximum bitrate set to about 4 megabits per second (Mbps)), setting QVBR to a lower quality level (e.g., 7) for a table or personal computer (PC) type of viewing device (e.g., with a maximum bitrate set to about 1.5-3 Mbps), and/or setting QVBR to an even lower quality level (e.g., 6) for a smartphone type of viewing device (e.g., with a maximum bitrate set to about 1-1.5 Mbps).

Embodiments herein make QVBR encoding human vision system (HVS) conscious. Embodiments herein provide content aware uniform quality for quality-defined variable bitrate (QVBR) encoding of video, e.g., by equalizing the viewing experience using human vision system (HVS) modeling, machine learning models. Embodiments herein provide content aware uniform quality for quality-defined variable bitrate (QVBR) encoding of videos by utilizing one or more machine learning models (e.g., trained for one or more quality metrics). Embodiments herein thus provide improvement of the viewing experience because quality will be uniform among all sequences (e.g., for the entire video) and/or of bandwidth savings (e.g., with reduction up to 10%). Embodiments herein equalize quality using one or more perceptual models (e.g., quality metrics), use machine learning to achieve the dual objective of higher bandwidth savings with improved visual quality, and/or provide a fast inference for the machine learning for real time applications (e.g., in contrast to machine learning models that are too computational prohibitive for real time usage). Embodiments herein optimize the video quality per frame (or per scene), e.g., at a significant bandwidth reduction.

Embodiments herein generate a predicted quantization parameter for a frame of a live video by a machine learning model (e.g., trained for a quality metric) receiving an input of features extracted from the frame and a quality level, and perform a real time encode of the live video based at least in part on the predicted quantization parameter to generate an encoded live video for transmittal to a viewer. In certain embodiments, the quantization parameter (QP) is a value that sets the amount of compression for every block (e.g., macroblock) in a frame, for example, with a large QP value indicating that there will be higher quantization, and thus more compression and lower quality, and a lower QP value indicating the opposite. In one embodiment, the possible QP values range from 0 to 51, e.g., according to a (e.g., H.264 or H.265) video encoding (e.g., compression) standard.

FIG. 1 is a diagram illustrating an environment 100 including a content delivery system/service 102 having a uniform quality predictor 110 to predict one or more quantization parameters and an encoder 116 to encode a media file (e.g., "input video") according to the one or more predicted quantization parameters according to some embodiments. In certain embodiments, video compression (e.g., of a content delivery system/service) includes a set of adjustable video configuration settings, e.g., QVBR content aware uniform quality mode 110A in FIG. 1. In certain embodiments, at the start of the video encoding process the user (e.g., operator) is to make an informed decision on these settings, e.g., to perform a QVBR encoding instead of another encoding. These settings may include a quality level setting (e.g., "desired quality level") of a plurality of quality levels (e.g., on a scale of 1-10). In certain embodiments, the quality level corresponds to a particular type of target display, for example, where the values according to display devices are:

Level 10: for archival use, this setting targets very high (e.g., visually-lossless) quality, Level 9: television or other large displays, Level 8: television or desktop computer displays, Level 7: desktop or tablet displays, Level 6: smart phone or other small display devices, and Levels 5-1: very small mobile displays with very low bitrate requirements.

Embodiments herein utilize a uniform quality predictor 110 (e.g., one or more machine learning models thereof) to generate a predicted quantization parameter (QP) for (e.g., a frame of) a live video for an input of features extracted from the video (e.g., the frame) and the quality level, e.g., and perform a real time encode of the live video based at least in part on the predicted quantization parameter to generate an encoded live video for transmittal to a viewer device 122. In certain embodiments, the encode is a single encode of the live video between receipt of the live video at the content delivery system/service and the transmitting the encoded live video to the viewer device 122. In one embodiment, the single encoding is a single-pass encoding.

In certain embodiments, a uniform quality predictor 110 (e.g., service and/or system) includes a (e.g., QVBR) content aware uniform quality mode 110A, e.g., that determines one or more predicted quantization parameters (QPs) for (e.g., a frame of) a live video for an input of features extracted from the video. In one embodiment, storing a first value into field for content aware uniform quality mode 110A causes the uniform quality predictor 110 to generate one or more predicted quantization parameters (QPs), e.g., and storing a second, different value into field for content aware uniform quality mode 110A causes the uniform quality predictor 110 to not generate (or use) the one or more predicted quantization parameters. As content delivery system/service 102 may be utilized for live (e.g., and video-on-demand) application, the computation overhead of the uniform quality predictor 110 is to be limited compared to the computation used by the entire encoding pipeline (e.g., encoder 116) to make it usable by a user (e.g., end user) in certain embodiments.

The depicted content delivery system/service 102 includes a content data store 104, which may be implemented in one or more data centers. In one embodiment, the media file (e.g., video file that is to be viewed by the viewer device 122) is accessed (for example, from the content data store 104 or directly from a content provider 136, e.g., as a live stream) by encoder 116 (e.g., by media file (e.g., fragment) generator 118). In certain embodiments, the (e.g., client) viewer device 122 requesting the media file (e.g., fragment(s) of media) from content delivery system/service 102 causes the encoder 116 to encode the video file, e.g., into a compressed format for transmittal on network(s) 120 to viewer device 122. In one embodiment, the media file generator 118 generates one or more subsets (e.g., frames, fragments, segments, scenes, etc.) of the media file (e.g., video), e.g., beginning with accessing the media file and generating the requested media (e.g., fragment(s)). In one embodiment, each fragment includes a plurality of video frames.

It may be desirable to allow uniform quality predictor 110 to generate one or more predicted quantization parameters (e.g., per frame), for example, without user device 130 or viewer device 122 inputting those quantization parameter(s). Content delivery system/service 102 includes uniform quality predictor 110. Depicted uniform quality predictor 110 uses one or more machine learning models to infer (e.g., optimal) quantization parameters for input video (e.g., from dotted path on the left of FIG. 1). Training and use of the machine learning model(s) are discussed further below, e.g., in reference to FIGS. 2-13.

In FIG. 1, content delivery system/service 102 is coupled to viewer device 122 and user device 130 via one or more networks 120, e.g., a cellular data network or a wired or wireless local area network (WLAN).

In certain embodiments, content delivery system/service 102 (e.g., uniform quality predictor 110 thereof) is to send a query (e.g., asking if content aware uniform quality mode 110A is desired) to user (e.g., operator) device 130, for example, and the user device 130 (e.g., in response to a command from a user of the device 130) is to send a response (e.g., an indication to enter or not enter content aware uniform quality mode 110A). Depicted user device 130 includes a display 132 having a graphical user interface (GUI) 134, e.g., to display a query for uniform quality predictor 110 to enter (or not) content aware uniform quality mode 110A.

Depicted viewer device 122 (e.g., where the viewer is a customer of user (e.g., operator) of device 130) includes a media player 124 having a decoder 126 to decode the media file (e.g., fragment) from the content delivery system/service 102, e.g., to display video and/or audio of the media file on display and/or audio output 128, respectively.

In certain embodiments, uniform quality predictor 110 in content aware uniform quality mode 110A uses machine learning model(s) (and/or is a machine learning powered service) that automatically determines one or more quantization parameters. For example, with one or more a uniform quality predictor machine learning models for determining one or more quantization parameters (e.g., a set of one or more quantization parameters for each (e.g., objective) quality metric as a setting that controls the encoding process by encoder 116. Encoding may compress a video file (e.g., according to the quantization parameter(s) into a plurality of compressed frames, for example, one or more an intra-coded picture frames (I-frames) (e.g., with each I-frame as a complete image), one or more predicted picture frames (P-frames or delta-frames) (e.g., with each P-frame having only the changes in the image from the previous frame), and/or one or more bidirectional predicted picture frames (B-frames) (e.g., that further saves space (e.g., bits) by using differences between the current frame and both the preceding and following frames to specify its content). For example, with P-frames and B-frames being inter-coded pictures. In one embodiment, each single I-frame includes a plurality of inter-coded frames (e.g., P-frames and/or B-frames), e.g., as a group of pictures (GOP).

Encoder settings may include values setting (or not setting) one, all, or any combination of the following: quantization parameter, spatial adaptive quantization strength, temporal adaptive quantization strength, flicker reduction, dynamic group-of-pictures (GOP) on/off, number of B-frames (e.g., per GOP), direct mode (e.g., allowing B-frames to use predicted motion vectors instead of actual coding of each frame's motion) (e.g., for a scene), prefilter on/off, delta quantization parameter (QP) offsets (e.g., between I-frame and P-frames/B-frames), rate distortion optimization quantization (RDOQ), speed settings, or additional configuration (e.g., encoder) settings. In certain embodiments, spatial adaptive quantization (AQ) strength is the amount of compression within a frame, e.g., where a more complex (e.g., based on spatial characteristics) proper subset (e.g., macroblock(s)) of a frame is provided more bits to encode more detail than the rest of the frame. In one embodiment, spatial AQ strength is within a range of 1 (e.g., least aggressive) to 15 (e.g., most aggressive). In certain embodiments, temporal adaptive quantization (AQ) strength is the amount of compression between frames, e.g., where a more complex (e.g., based on temporal characteristics) frame is provided more bits to encode more detail than another frame(s). In one embodiment, temporal AQ strength is within a range of 0 (e.g., disabled) to 1 (e.g., enabled).

In certain embodiments, the encoder settings are divided into a plurality of categories, for example, (i) exposed to the user (e.g., via user device 130), e.g., any setting (e.g., configuration) that is exposed in a GUI of the product: (ii) internal commands, e.g., any setting (e.g., configuration) that is available in a command line, and/or (iii) previously static, e.g., but can be content dependent according to embodiments herein. In one embodiment, the (i) GUI exposed encoder setting(s) may include entry or not into "content aware uniform quality mode" 110A and may not include selecting a quantization parameter.

In certain embodiments, the predicted quantization parameters generated by uniform quality predictor 110 in content aware uniform quality mode 110A (e.g., via machine learning model(s) thereof) are provided to the encoder 116 and used to encode the input (e.g., live) video. The input video is shown as being provided from encoder front end 106, but it should be understood that the input video may be provided directly to encoder 116, for example, from (e.g., live) content provider 136.

In certain embodiments, content delivery system/service 102 includes an encoder front end 106, e.g., as the pre-analysis stage of an encoding. In certain embodiments, encoder front end 106 extracts one or more features 108 (e.g., statistics) from the input video, e.g., on a per scene, per GOP, per frame, per block, etc., of granularity. In FIG. 1, an input video may be received, for example, from content data store 104 or directly from content provider(s) 136 (e.g., a live video), and routed to encoder front end 106 to determine one or more features (e.g., at a scene, GOP, frame, and/or block granularity) (e.g., features). In certain embodiments, encoder front end 106 outputs an indication of complexity to rate controller 114.

In certain embodiments, rate controller 114 receives an input of the available bandwidth for transmitting the encoded video file, e.g., via network(s) 120 in FIG. 1. In certain embodiments, rate controller selects the quantization parameter (QP) that is to be used for that section (e.g., scene, GOP, frame, or block) of the input video, e.g., based on the predicted QP, complexity, and/or bandwidth. This may be repeated for each section (e.g., scene, GOP, frame, or block) of the video.

In certain embodiments, content delivery system/service 102 includes a buffer (e.g., a look ahead buffer) to store one or more frames that are to be encoded. The data included in each buffer entry may be a predicted quantization parameter (QP), e.g., from a prediction for each frame.

In certain embodiments, the predicted quantization parameter(s) are output from uniform quality predictor 110 for an input of a desired quality level (e.g., 1-10 as discussed herein) (e.g., a codec agnostic quality level), frame features, maximum bitrate, actual quantization parameter used for a frame (e.g., from rate controller 114), or any one or combination thereof. In certain embodiments, a machine learning model of uniform quality predictor 110 is trained for a (e.g., objective) quality metric, e.g., SSIM, VMAF, etc. In certain embodiments, the quantization parameters are accordingly to a video encoding standard, e.g., a range of possible quantization parameter (e.g., 0 to 51).

In certain embodiments, the uniform quality predictor 110 includes one or more machine learning models that are trained (e.g., offline) on a wide variety of content and scenarios. In one embodiment, a machine learning model is a content classifier type of model.

In certain embodiments, a machine learning model of uniform quality predictor 110 predicts an optimal quantization parameter as a function of encoding settings (e.g., other than QP) and frame features (e.g., spatial and/or temporal features), e.g., and quality level. For example, given a number "N" of quality levels, there exists a min rate and max rate that defines a confidence interval, and the model is designed with this consideration in certain embodiments.

In certain embodiments, a machine learning model of uniform quality predictor 110 predicts an optimal quantization parameter as a function of quality level mapping to video objective metrics. Instead of selecting manually (e.g., by human visual inspection) the quantization parameter corresponding to a quality level, embodiments herein map quality level to an objective metric, e.g., where the mapping increases the number of points considered in the process. One major drawback is the intrinsic limitation of certain objective quality metrics. To overcome this solution, certain embodiments herein utilize objective metric(s) as a separation factor between classes (e.g., from different models) rather than a measure of quality. For example, PSNR is fairly limited as an objective metric in certain embodiments, such that a difference of 1 decibel (dB) at 40-50 dB is nonconclusive, a difference of 5 dB at the 30 dB range is an indication that quality has drastically changed (e.g., given the same quantization, pixel level filtering, encoder settings, and no horizontal/vertical shift), and heuristically PSNR over 45 dB is pristine quality in certain embodiments. Thus, embodiments herein utilize multiple different models that are each trained for a different (e.g., objective) quality metric, e.g., PSNR, SSIM, VMAF, etc.

Figure 2:
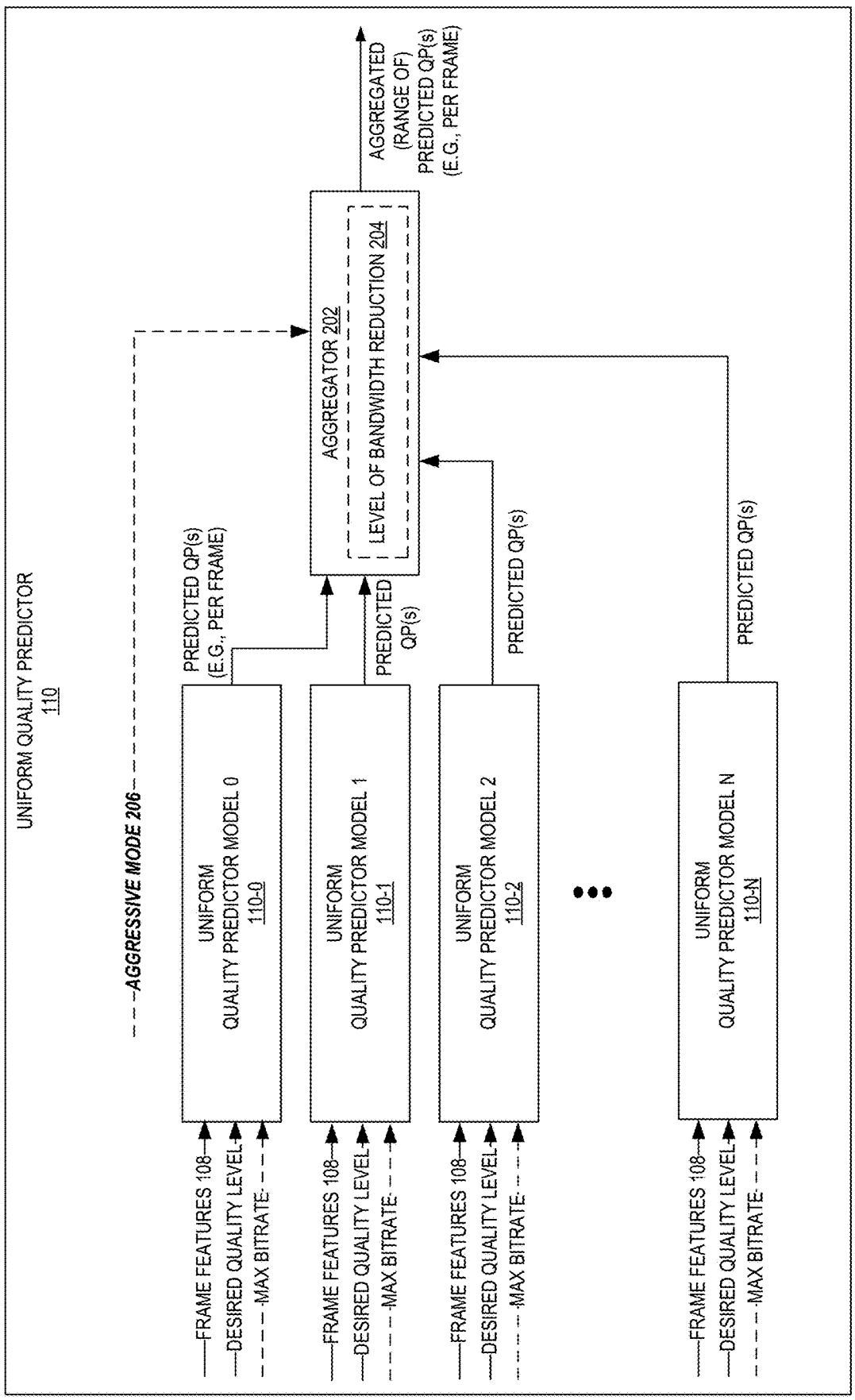
FIG. 2 is a diagram illustrating a uniform quality predictor comprising a plurality of uniform quality predictor machine learning models and an aggregator according to some embodiments.

FIG. 2 is a diagram illustrating a uniform quality predictor 110 comprising a plurality of uniform quality predictor machine learning models 0 to N (110-0 to 110-N) (where N is any positive integer) and an aggregator 202 according to some embodiments. In certain embodiments, each uniform quality predictor machine learning model 110-0 to 110-N receives the same set of inputs, e.g., a set of features 108 for the frame (e.g., or frame(s)) being analyzed, and a desired (e.g., QVBR) quality level (e.g., 1-10), and optionally, a maximum bitrate. In certain embodiments, each model is (e.g., separately) trained for a respective (e.g., objective) quality metric. For example, where model 0 110-0 is trained for PSNR, model 1 110-1 is trained for SSIM, model 2 110-2 is trained for VMAF, etc. In certain embodiments, each model outputs a predicted quantization parameter (or range of parameters) for the inputs, e.g., along with corresponding confidence levels (for example, scores or intervals, e.g., on a scale of 0 or 1 to 100).

Where multiple models are used, certain embodiments herein perform a multiple metric optimization, e.g., a joint optimization of two or more metrics.

In certain embodiments, an aggregator 202 is included to aggregate the output, predicted quantization parameters (or QP ranges) from the models into a single, aggregated (e.g., range of) predicted quantization parameter(s), e.g., per frame. In certain embodiments, aggregator 202 is to determine the optimal quantization parameter(s), e.g., that satisfies the conditions on quality level (e.g., quality uniformity) and/or achieves the desired level of bandwidth reduction 204. In one embodiment, the level of bandwidth reduction 204 is set by a value received for an "aggressive mode" 206. The value received for "aggressive mode" 206 may be sent from user device 130 and/or viewer device 122. In one embodiment, the value for "aggressive mode" 206 is selected from low, medium, high, and maximum, e.g., as discussed in reference to FIG. 8.

Thus, in certain embodiments, uniform quality predictor 110 performs a multiple modal uniform quality determination to generate a quantization parameter (or QP range) for a given quality level. For example (e.g., for each frame in buffer 112 in FIG. 1), uniform quality predictor 110 uses a multiple model approach where each model 110-0 to 110-N returns a list of QPs and their corresponding confidence level, e.g., and aggregator 202 aggregates (e.g., by averaging) the confidence level and/or using the aggressive mode 206 user settings to determine the QP to use for the current frame (e.g. during encode).

Figure 3:
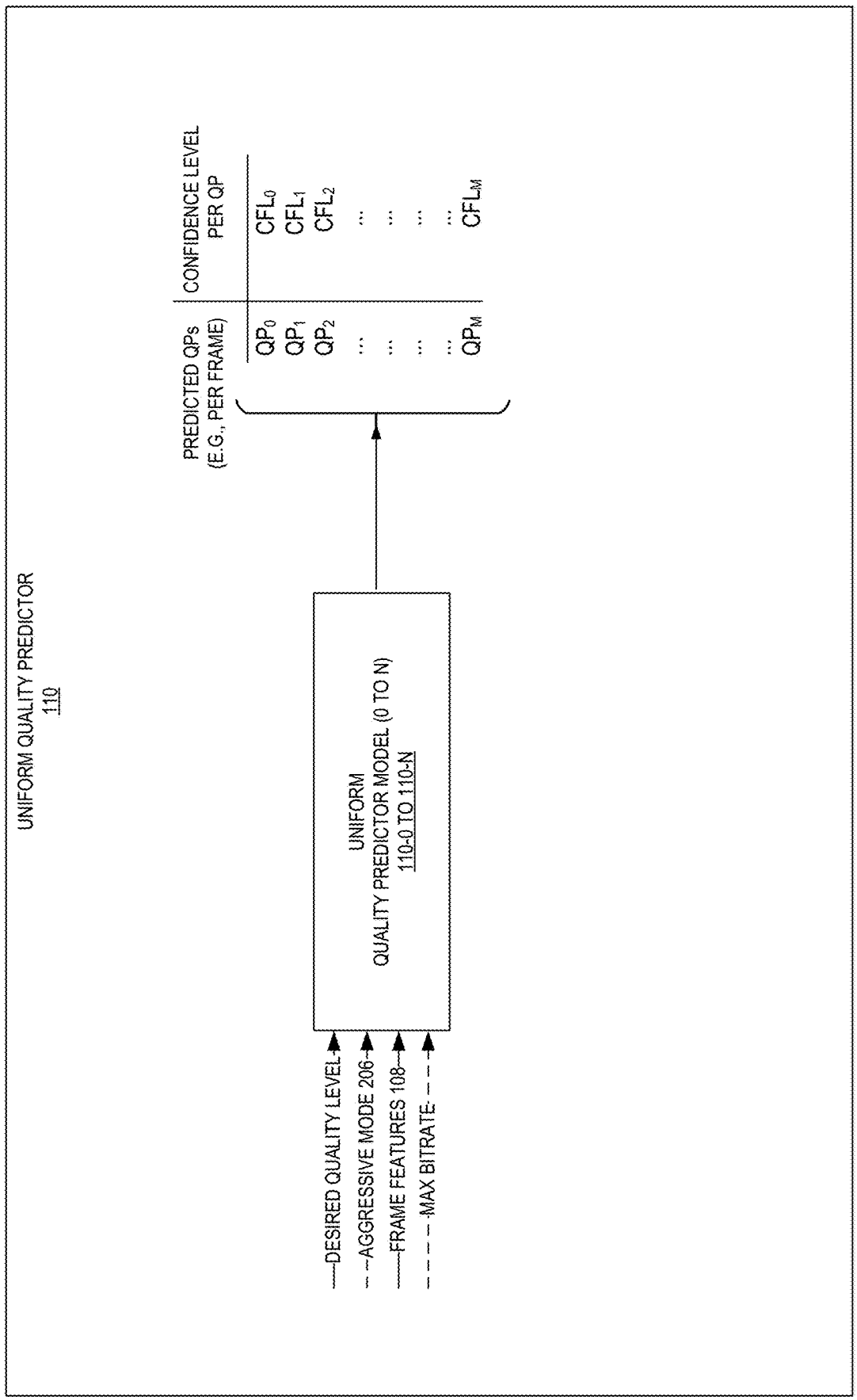
FIG. 3 is a diagram illustrating a uniform quality predictor comprising a uniform quality predictor machine learning model that generates a plurality of predicted quantization parameters and respective confidence levels according to some embodiments.

FIG. 3 is a diagram illustrating a uniform quality predictor 110 comprising a uniform quality predictor machine learning model 110-0 to 110-N that generates a plurality of predicted quantization parameters ($QP_0$ to $QP_M$, where M is any positive integer) and respective confidence levels ($CFL_0$ to $CFL_M$) according to some embodiments. In certain embodiments, each uniform quality predictor machine learning model generates a plurality of predicted quantization parameters ($QP_0$ to $QP_M$, where M is any positive integer) and respective confidence levels ($CFL_0$ to $CFL_M$) for one, all, or any of the following inputs: a set of features 108 for the frame (e.g., or frame(s)) being analyzed, a desired (e.g., QVBR) quality level (e.g., 1-10), and optionally, a maximum bitrate and/or value for "aggressive mode" 206 bandwidth reduction. In certain embodiments, each uniform quality predictor machine learning model outputs a confidence level (CFL) for each predicted QP (e.g., of a range of 0 to 51), e.g., where the confidence level corresponds to a respective (e.g., objective) quality metric.

In one embodiment, each model (e.g., uniform quality predictor model) corresponds to a separate objective metric, e.g., and takes as input required quality level (e.g., in a range), and aggressive mode value (e.g., in a range), and frame features (e.g., as frame descriptive statistics), and outputs a table of QPs and their corresponding confidence level.

In certain embodiments, the confidence level will try to account for the intrinsic shortcomings of any accuracy loss due to prediction and/or any intrinsic limitations of the objective metrics (e.g., in modeling quality). In certain embodiments, the output from a (e.g., each) model is a normal distribution (e.g., bell) shape.

In certain embodiments, a (e.g., each) model of a uniform quality predictor 110 is (e.g., for each frame of a given a buffer of N frames to be encoded) to receive an input of a requested quality level and level of aggressive bandwidth reduction, and in response, determine for each frame (e.g., of the look ahead buffer) the corresponding optimal quantization parameter(s). In certain embodiments, uniform quality predictor 110 is to smooth the QPs among all frames (e.g., to account for prediction inaccuracies). In certain embodiments, uniform quality predictor 110 is to apply corrections from the already encoded frames, e.g., as feedback for re-training the model(s).

In certain embodiments, a model outputs a single predicted quantization parameter (e.g., along with a corresponding confidence score (e.g., where a higher score indicates more confidence in the prediction than a lower score)) for a single set of inputs (e.g., for a single frame and/or quality level). In other embodiments, a model outputs multiple predicted quantization parameters (e.g., along with a corresponding confidence scores) for a single set of inputs (e.g., for a single frame and/or quality level). In one embodiment, a uniform quality predictor model is offline trained, e.g., as discussed in reference to FIG. 10. In one embodiment, training inputs are frame features (e.g., statistics) and the outputs are the discretized quality level (e.g., translation from VMAF: 0-100 to quality levels 1-10).

In certain embodiments, a model is designed to output a QP and/or (e.g., minimum and maximum for a) range of predicted QPs based on a target quality level. Two examples of this are "direct" models that directly predict the QP based on the target quality level (e.g., as discussed in reference to FIG. 4) and "inverse" models that predicts the (e.g., objective) quality metric of the current frame given a QP, and use that to determine the QP based on the target quality level (e.g., as discussed in reference to FIG. 5).

Figure 4:
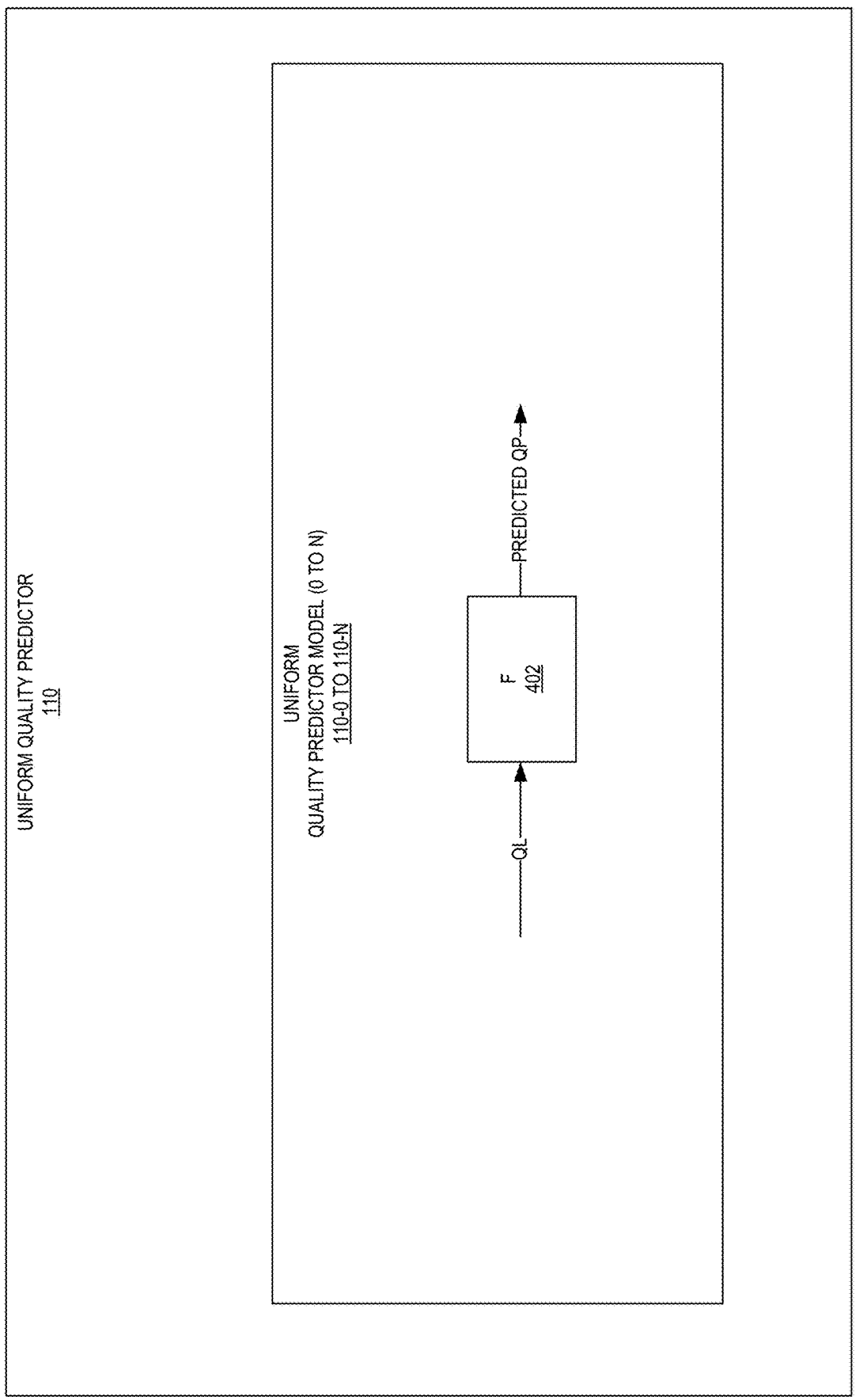
FIG. 4 is a diagram illustrating a uniform quality predictor comprising a uniform quality predictor machine learning model that generates a predicted quantization parameter for an input of a quality level according to some embodiments.

FIG. 4 is a diagram illustrating a uniform quality predictor 110 comprising a uniform quality predictor machine learning model 110-0 to 110-N that generates a predicted quantization parameter for an input of a quality level according to some embodiments. The model in FIG. 4 utilizes a direct function (F) 402 to directly predict a quantization parameter for a set of inputs (e.g., including quality level).

In certain embodiments, a direct model is harder to train because a range of QPs can be mapped to a single quality level. In certain embodiments, an inverse model predicts the objective metric of the current frame given a quantization parameter. For example, in finding the optimal quantization parameter, the uniform quality predictor 110 will loop through the candidate quantization parameters (e.g., 0 to 51), estimate the (e.g., objective) quality metric, and find the objective metric that falls inside the corresponding quality level range. This model may be referred to as the inverse function $F^{-1}$.

Figure 5:
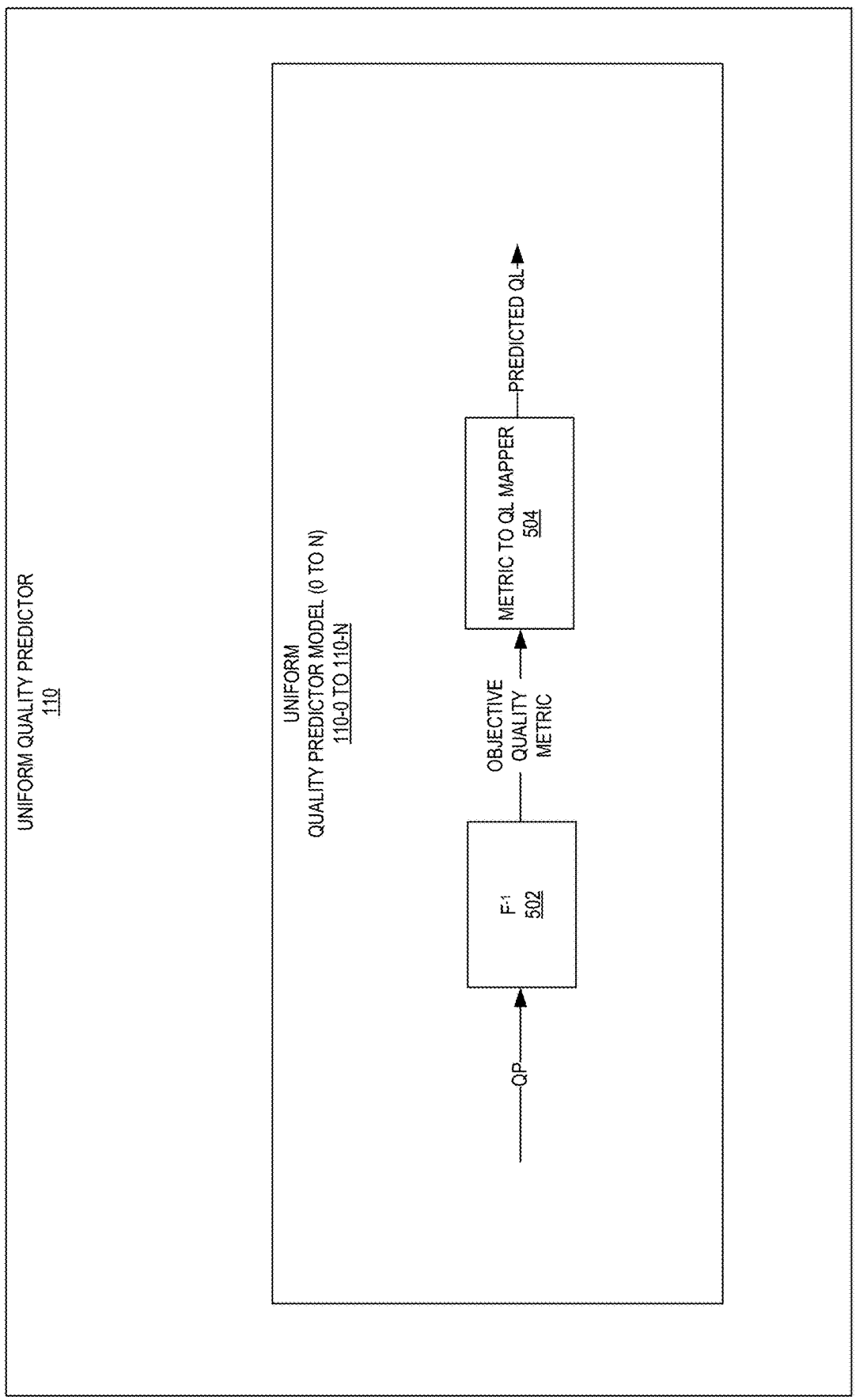
FIG. 5 is a diagram illustrating a uniform quality predictor comprising a uniform quality predictor machine learning model that generates a predicted quality level for an input of a quantization parameter according to some embodiments.

FIG. 5 is a diagram illustrating a uniform quality predictor 110 comprising a uniform quality predictor machine learning model 110-0 to 110-N that generates a predicted quality level for an input of a quantization parameter according to some embodiments. Instead of directly predicting the QP (e.g., range) from a given quality level, the model in FIG. 5 utilizes an inverse function $F^{-1}$ 502 that generates a (e.g., objective) quality metric (e.g., VMAF, etc. score) (e.g., value) from an input of a quantization parameters, and then maps that quality metric value to an quality level. For example, by looping over all the possible quantization parameters (e.g., 0-51), and for each QP, predicting the (e.g., objective) quality metric (e.g., the measure of quality if that QP is selected for the current frame), and use the discretized quality levels, e.g., by mapping each quality metric to a corresponding quality level by mapper 504. In one embodiment, uniform quality predictor 110 performs operations of looping through an input of each of a plurality of candidate quantization parameters into inverse function $F^1$ 502 of a machine learning model to output corresponding quality metric values of a quality metric, determining a mapping by mapper 504 of a corresponding quality level to the corresponding quality metric values, and selecting a predicted quantization parameter as an output from the mapping based at least in part on the quality level for encoding the video.

Figure 6:
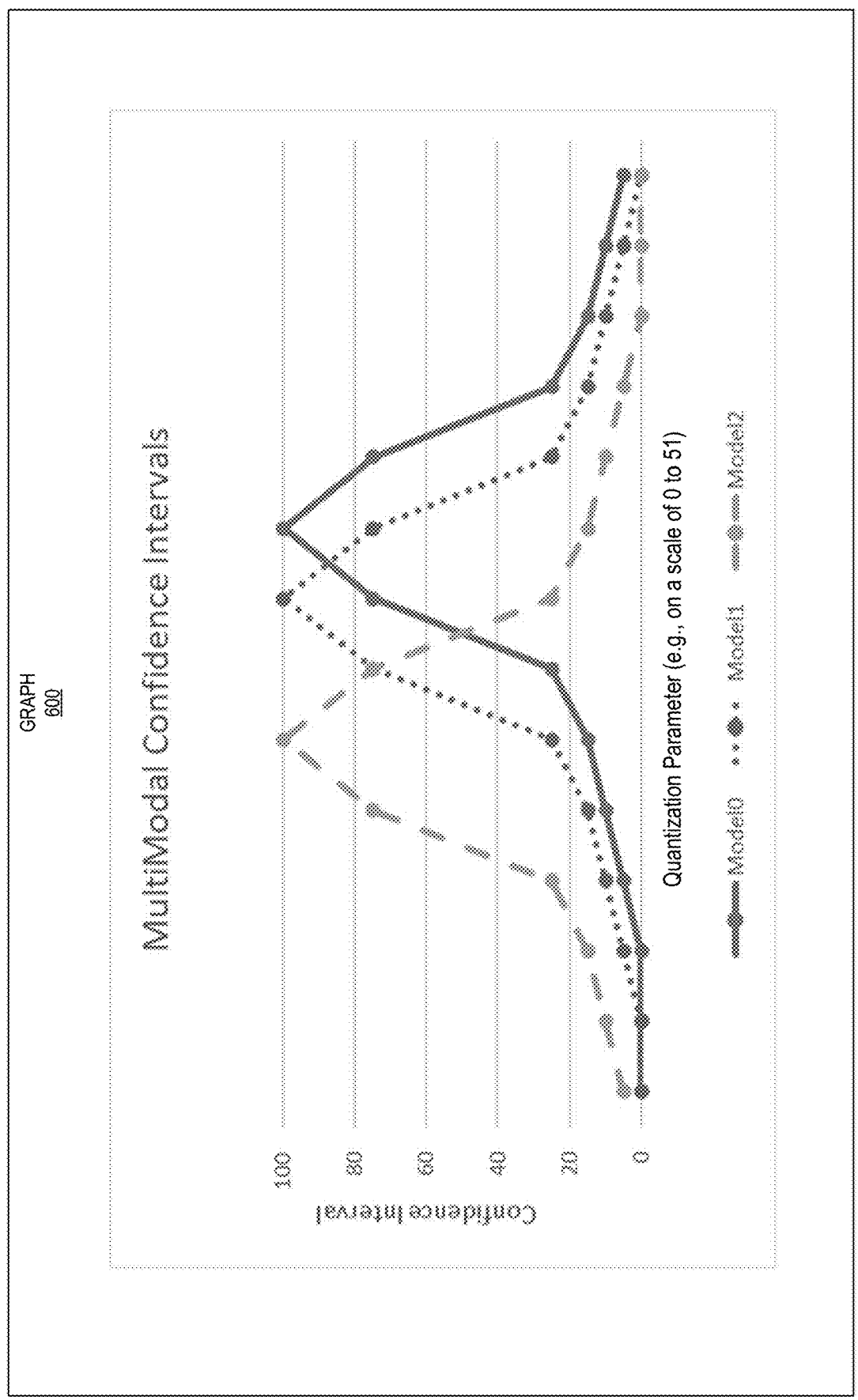
FIG. 6 is a graph illustrating confidence levels versus predicted quantization parameters for each of a plurality of uniform quality predictor machine learning models according to some embodiments.

FIG. 6 is a graph 600 illustrating confidence levels (e.g., intervals) versus predicted quantization parameters for each of a plurality of uniform quality predictor machine learning models according to some embodiments. Although three models are depicted, certain embodiments herein may utilize any plurality of models. For example, with the data in FIG. 6 output from a corresponding model, e.g., as shown in FIG. 3.

Figure 7:
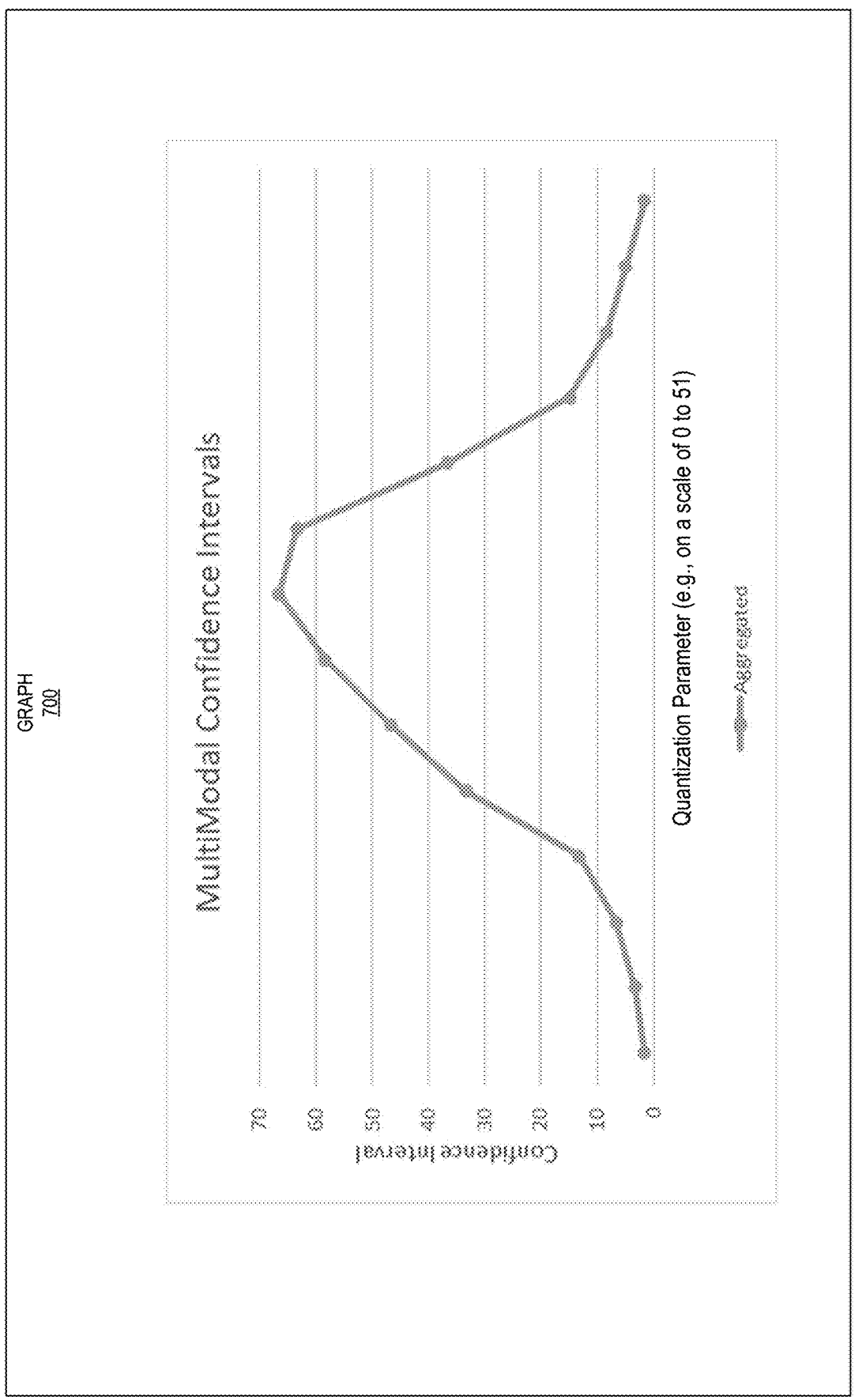
FIG. 7 is a graph illustrating confidence levels versus predicted quantization parameters aggregated for a plurality of uniform quality predictor machine learning models according to some embodiments.

FIG. 7 is a graph 700 illustrating confidence levels versus predicted quantization parameters aggregated for a plurality of uniform quality predictor machine learning models according to some embodiments. In one embodiment, the graph 700 is an aggregation of the data from graph 600. In certain embodiments, aggregator (e.g., aggregator 202 in FIG. 2) is to aggregate (e.g., by averaging) the confidence intervals over all the QPs from the output of the uniform quality predictor models. In one embodiment, the aggregated confidence values (e.g., intervals) are computed as an average of all the outputs of the uniform quality predictor models, e.g., and if there is no corresponding QP entry for an output, 0 will be used.

In certain embodiments, once the aggregated QP/confidence values are computed (e.g., shown graphically in FIG. 7 but that is not required), a quantization parameter is chosen therefrom. For example, for an input of a level of bandwidth reduction 204 in FIG. 2 (e.g., "aggressive mode" 206 value), certain embodiments herein select one or more quantization parameters from the aggregated QP/confidence values. A plurality of strategies may be used to select the optimal QP(s). A region-based strategy is discussed in reference to FIG. 8.

Figure 8:
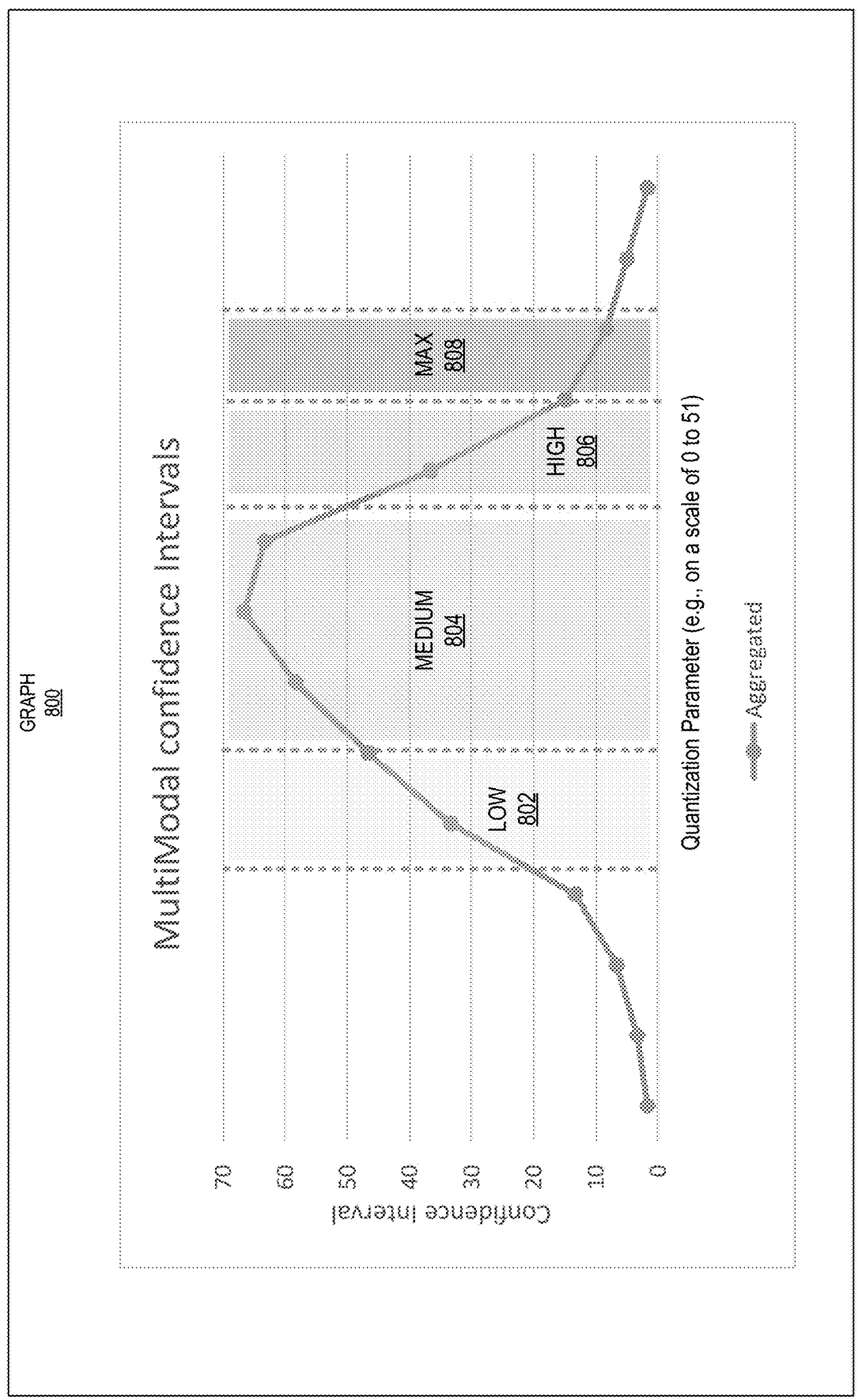
FIG. 8 is a graph illustrating ranges of predicted quantization parameters for different levels of bandwidth reduction for confidence levels versus predicted quantization parameters aggregated for a plurality of uniform quality predictor machine learning models according to some embodiments.

FIG. 8 is a graph 800 illustrating ranges (e.g., low 802, medium 804, high 806, and maximum 808) of predicted quantization parameters for different levels of bandwidth reduction for confidence levels versus predicted quantization parameters aggregated for a plurality of uniform quality predictor machine learning models according to some embodiments. For example, where the aggregated data is the data from FIG. 7. In one embodiment, if a high 806 level of aggression for bandwidth reduction is desired, the QP(s) for that frame may be those within the high 806 portion of graph 800.

Figure 9:
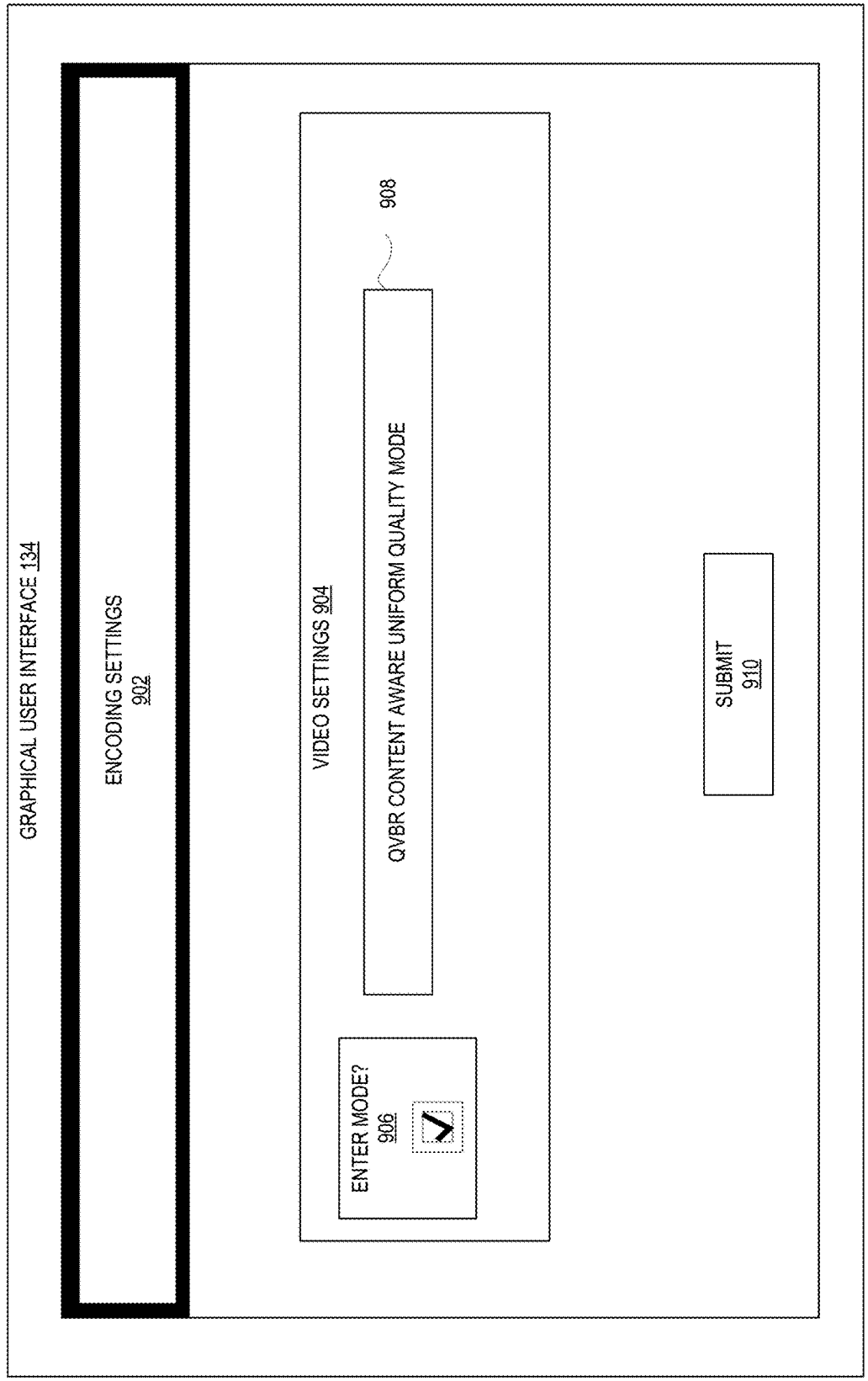
FIG. 9 is a diagram illustrating a graphical user interface for setting a content delivery system/service into a quality-defined variable bitrate (QVBR) content aware uniform quality mode according to some embodiments.

FIG. 9 is a diagram illustrating a graphical user interface for setting a content delivery system/service into a quality-defined variable bitrate (QVBR) content aware uniform quality mode according to some embodiments. Depicted graphical user interface 134 includes a field 902 that is customizable with text to indicate that these are encoding settings, a field 904 that is customizable with text to indicate that these are video settings, an interface element 906 that, when selected, will cause the content delivery system/service to enter a quality-defined variable bitrate (QVBR) content aware uniform quality mode, and a field 908 that is customizable with text to indicate that selecting the interface element 906 is to cause automatic generation of quantization parameters(s). A user may click the submit interface element 910 to (e.g., cause a command to be sent that causes) entry of a content delivery system/service into a quality-defined variable bitrate (QVBR) content aware uniform quality mode (e.g., mode 110A in FIGS. 1 and 10). An interface element, may include, but is not limited to, a thumbs up (or down), checkbox, button, dropdown menu, etc.

Figure 10:
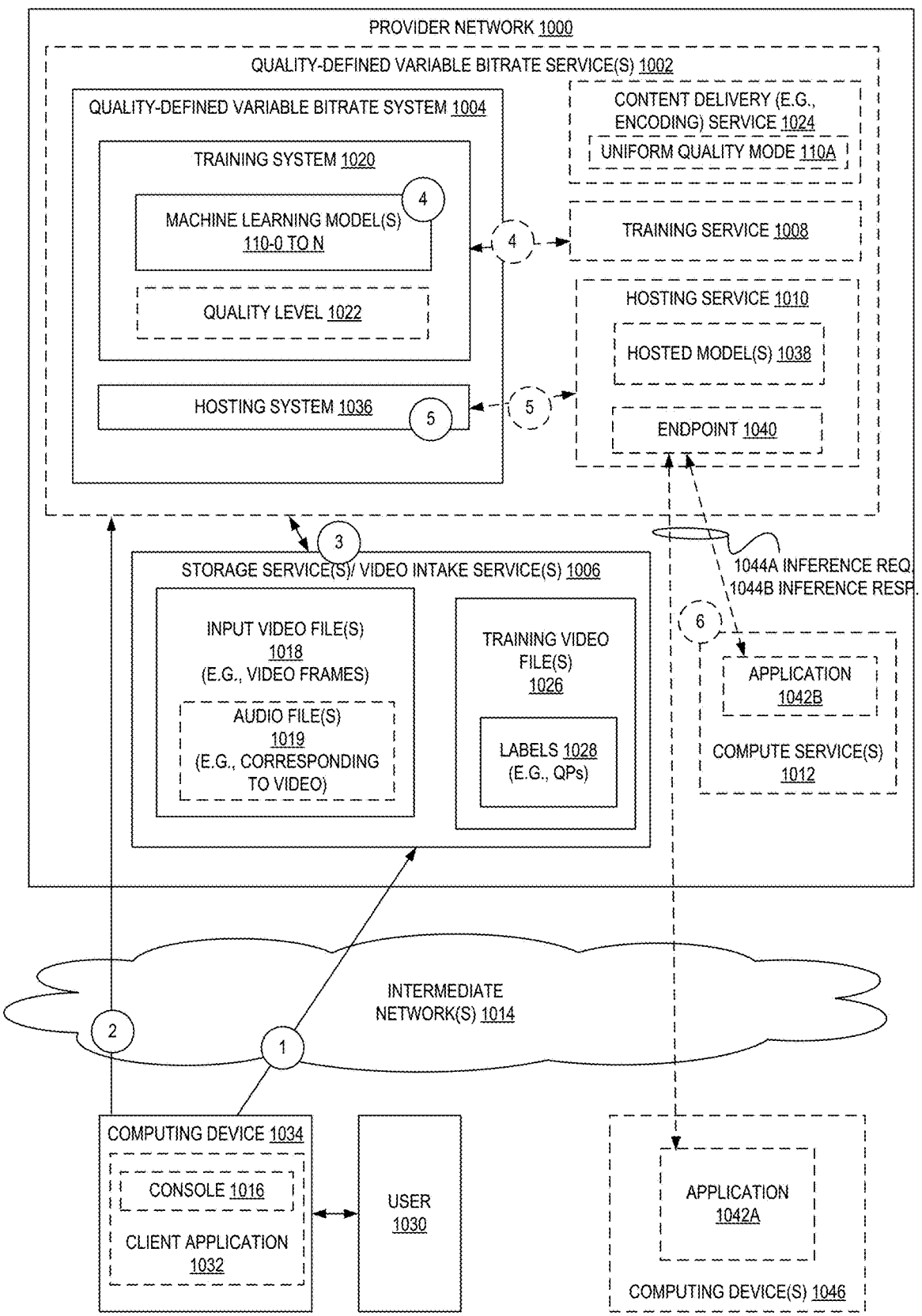
FIG. 10 is a diagram illustrating an environment for creating, training, and using machine learning models of a quality-defined variable bitrate (QVBR) service according to some embodiments.

FIG. 10 is a diagram illustrating an environment for creating, training, and using machine learning models of a quality-defined variable bitrate (QVBR) service 1002 according to some embodiments. FIG. 10 includes a quality-defined variable bitrate (QVBR) system 1004, one or more storage/video intake services 1006, one or more training services 1008, one or more hosting services 1010, one or more compute services 1012, and one or more content delivery services 1024 implemented within a multi-tenant provider network 1000. Each of the dynamic video quality optimizer service 1002, one or more storage/video intake services 1006, one or more training services 1008, one or more hosting service 1010, one or more compute services 1012, and one or more content delivery services 1024 may be implemented via software, hardware, or a combination of both, and may be implemented in a distributed manner using multiple different computing devices.

A provider network 1000 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 1012), a storage service 1006 that can store data objects, etc. The users (or "customers") of provider networks 1000 may utilize one or more user accounts that are associated with a customer account, though these terms may be used somewhat interchangeably depending upon the context of use. Users may interact with a provider network 1000 across one or more intermediate networks 1014 (e.g., the internet) via one or more interface(s), such as through use of application programming interface (API) calls, via a console 1016 implemented as a website or application, etc. The interface(s) may be part of, or serve as a front-end to, a control plane of the provider network 1000 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 1000 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 1000 by an on-demand code execution service (which may be one of compute service(s) 1012) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions (e.g., as an application 1040B) that can be executed on demand, without requiring the user to maintain dedicated infrastructure to execute the serverless function. Instead, the serverless functions can be executed on demand using resources maintained by the provider network 1000. In some embodiments, these resources may be maintained in a "ready" state (e.g., having a pre-initialized runtime environment configured to execute the serverless functions), allowing the serverless functions to be executed in near real-time.

The quality-defined variable bitrate (QVBR) service 1002, in some embodiments, is a machine learning powered service that makes it easy for users to automatically configure settings for a video encoder. In some embodiments, quality-defined variable bitrate (QVBR) service 1002—via use of training service 1008—allows users to build and use models to perform tasks for generating quantization parameters (e.g., for one or more input video file(s) 1018 (having one or more (e.g., corresponding) audio file(s) 1019)). In some embodiments, the quality-defined variable bitrate (QVBR) service 1002 (e.g., training system 1020) trains and uses one or more machine learning models 110-0 to 110-N. The training system 1020, for example, may enable users to generate machine learning models 110-0 to 110-N that infer quantization parameter(s) from one or more input video file(s) 1018. In certain embodiments, the machine learning model(s) 110-0 to 110-N utilizes one or more components depicted in FIGS. 2-8.

Embodiments herein allow a customer to create machine learning models 110-0 to 110-N by supplying training video file(s) 1026 (e.g., including labels 1028 that indicate optimal quantization parameter(s) for certain sections).

At a high level, machine learning may include two major components that are required to be put in place in order to expose advertised functionality to the customer: (i) training and (ii) inference. Training may include the following responsibilities: training data analysis; data split (training, evaluating (e.g., development or validation), and testing data); model selection; model training; model evaluation; and status reporting. Inference may include the following responsibilities: model loading and hosting; and inference (e.g., synchronous and batch).

Training may include using a hyperparameter optimization (HPO) pipeline to evaluate a plurality of models and respective configurations. Training may perform a grid search over the matrix of experiments (e.g., defined upfront) in search for the model and its parameters that performs best on the given dataset.

Thus, a user 1030 may provide or otherwise identify a training dataset 1026 with labels 1028 (e.g., media (e.g., video) file and its corresponding QP labels) for use in creating a model. For example, as shown at circle (1), the user 1030 may utilize a client application 1032 executed by a computing device 1034 (e.g., a web-application implementing a console 1016 for the provider network 1000, a standalone application, another web-application of another entity that utilizes the quality-defined variable bitrate (QVBR) service 1002 as a part of its backend, a database or mixed-SQL environment, etc.) to cause the computing device 1034 to upload the training dataset 1026 with labels 1028 to a storage location (e.g., provided by a storage service 1006 such as an object storage service of a provider network 1000).

Thereafter, at circle (2) the computing device 1034 may issue one or more requests (e.g., API calls) to the quality-defined variable bitrate (QVBR) service 1002 that indicate the user's 1030 desire to train a machine learning model(s) 110-0 to 110-N, e.g., for a given quality level 1022. The request may be of a type that identifies which type of model is to be created, e.g., CreateUniformQualityPredictorModel for creating a machine learning model(s) 110-0 to 110-N that infers quantization parameter(s). The request may also include one or more of an identifier of a storage location or locations storing the training dataset 1026 (e.g., an identifier of just the video files, an identifier of just the labels 1028, an identifier associated with both the video files and labels, etc.), which may identify a storage location (e.g., via a Uniform Resource Locator (URL), a bucket/folder identifier, etc.) within the provider network 1000 (e.g., as offered by a storage service 1006) or external to the provider network 1000, a format identifier of the dataset 1026, a language identifier of the language of the dataset 1026, labels 1028, etc.

Responsive to receipt of the request, the training system 1020 of the quality-defined variable bitrate (QVBR) service 1002 is invoked and begins operations for training the corresponding type of model.

In some embodiments, the training at circle (4) of the machine learning model(s) 110-0 to 110-N includes use (at optional, dotted circle (4)) of a separate training service 1008 of quality-defined variable bitrate (QVBR) service 1002; similarly, the hosting system 1036 may make use (at optional, dotted circle (5)) of a hosting service 1010 of a quality-defined variable bitrate (QVBR) service 1002 to deploy a model as a hosted model 1038 in association with an endpoint 1040 that can receive search requests from client applications 1042A and/or 1042B at circle (6), provide the inference requests 1044A to the associated hosted model(s) 1038, and provide search results 1044B (e.g., predicted encoder setting(s)) back to applications 1042A and/or 1042B, which may be executed by one or more computing devices 1046 outside of the provider network 1000 or by one or more computing devices of a compute service 1012 (e.g., hardware virtualization service, serverless code execution service, etc.) within the provider network 1000. In one embodiment, predicted encoder setting(s) are used by content delivery (e.g., encoding) service 1024, e.g., when mode 110A is selected.

Figure 11:
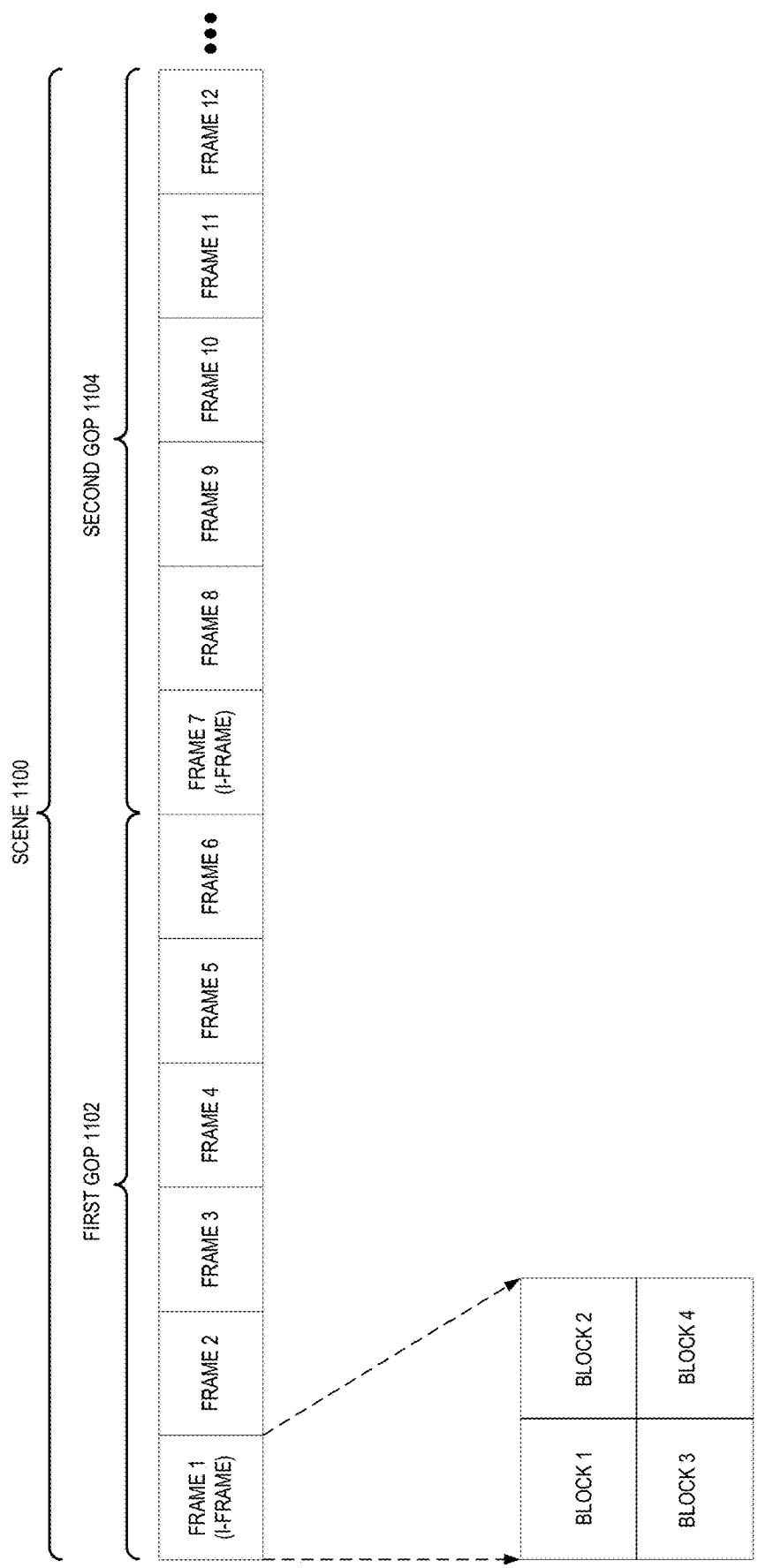
FIG. 11 is a diagram illustrating a scene having a plurality of groups of pictures, and a frame formed from a plurality of blocks (e.g., macroblocks) according to some embodiments.

FIG. 11 is a diagram illustrating a scene 1100 having a plurality of groups of pictures 1102, 1104, and a frame (frame 1) formed from a plurality of blocks (blocks 1-4) (e.g., macroblocks) according to some embodiments. The number of scenes, GOPs (frames therein), and blocks are merely examples, e.g., it should be understood that any number of scenes, GOPs (frames therein), and blocks may be utilized.

Figure 12:
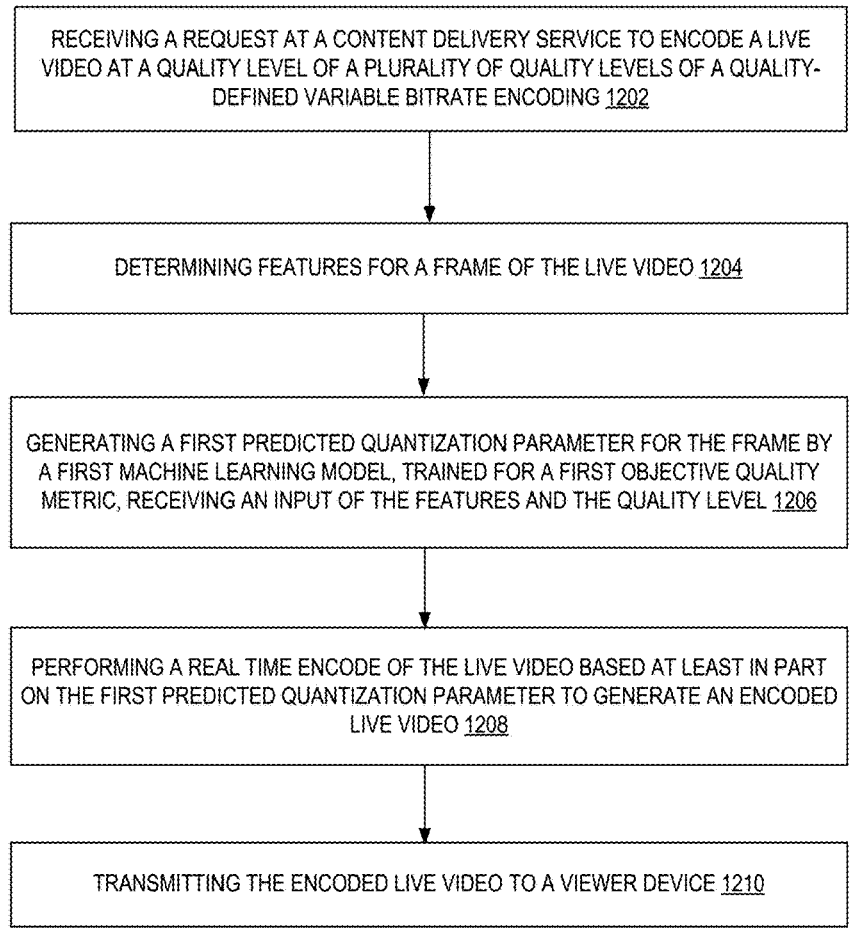
FIG. 12 is a flow diagram illustrating operations of a method for generating and using a predicted quantization parameter for a quality level of a plurality of quality levels of a quality-defined variable bitrate encoding in encoding a live video according to some embodiments.

FIG. 12 is a flow diagram illustrating operations 1200 of a method for generating and using a predicted quantization parameter for a quality level of a plurality of quality levels of a quality-defined variable bitrate encoding in encoding a live video according to some embodiments. Some or all of the operations 1200 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1200 are performed by content delivery system/ service (or a component thereof) of the other figures.

The operations 1200 include, at block 1202, receiving a request at a content delivery service to encode a live video at a quality level of a plurality of quality levels of a quality-defined variable bitrate encoding. The operations 1200 further include, at block 1204, determining features for a frame of the live video. The operations 1200 further include, at block 1206, generating a first predicted quantization parameter for the frame by a first machine learning model, trained for a first objective quality metric, receiving an input of the features and the quality level. The operations 1200 further include, at block 1208, performing a real time encode of the live video based at least in part on the first predicted quantization parameter to generate an encoded live video. The operations 1200 further include, at block 1210, transmitting the encoded live video to a viewer device.

Figure 13:
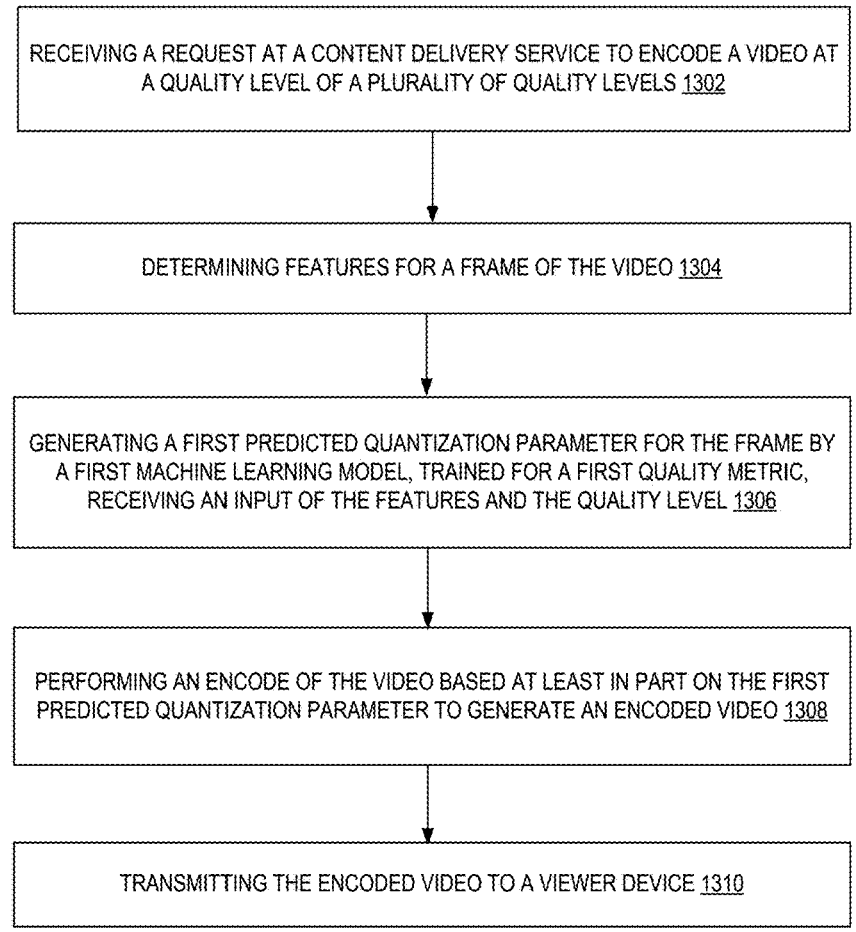
FIG. 13 is a flow diagram illustrating operations of a method for generating and using a predicted quantization parameter for a quality level of a plurality of quality levels in encoding a video according to some embodiments.

FIG. 13 is a flow diagram illustrating operations 1300 of a method for generating and using a predicted quantization parameter for a quality level of a plurality of quality levels in encoding a video according to some embodiments. Some or all of the operations 1300 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1200 are performed by content delivery system/service (or a component thereof) of the other figures.

The operations 1300 include, at block 1302, receiving a request at a content delivery service to encode a video at a quality level of a plurality of quality levels. The operations 1300 further include, at block 1304, determining features for a frame of the video. The operations 1300 further include, at block 1306, generating a first predicted quantization parameter for the frame by a first machine learning model, trained for a first quality metric, receiving an input of the features and the quality level. The operations 1300 further include, at block 1308, performing an encode of the video based at least in part on the first predicted quantization parameter to generate an encoded video. The operations 1300 further include, at block 1310, transmitting the encoded video to a viewer device.

Exemplary environments, systems, etc. that the above may be used in are detailed below.

Figure 14:
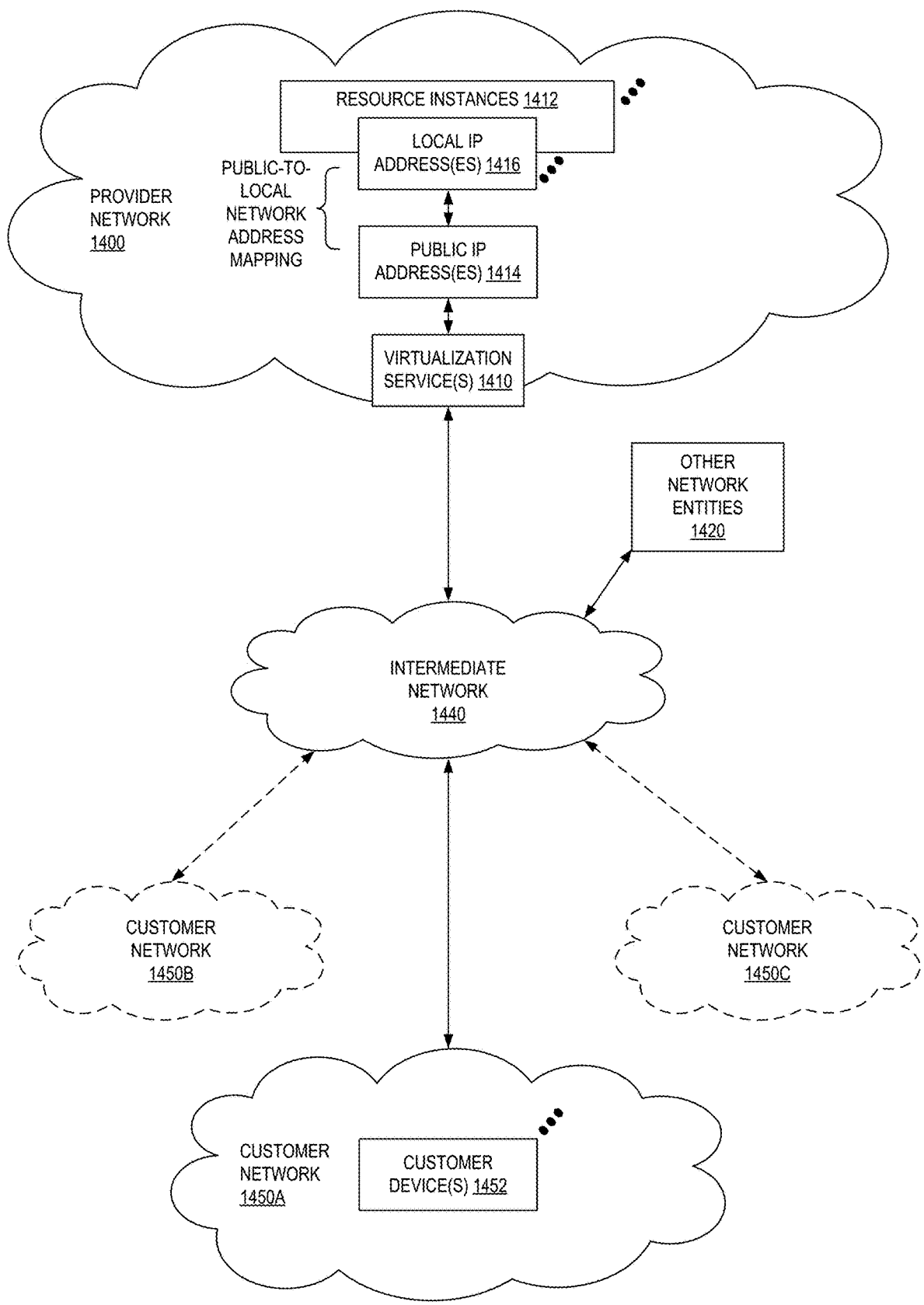
FIG. 14 illustrates an example provider network environment according to some embodiments.

FIG. 14 illustrates an example provider network (or "service provider system") environment according to some embodiments. A provider network 1400 may provide resource virtualization to customers via one or more virtualization services 1410 that allow customers to purchase, rent, or otherwise obtain instances 1412 of virtualized resources, including but not limited to computation and storage resources, implemented on devices within the provider network or networks in one or more data centers. Local Internet Protocol (IP) addresses 1416 may be associated with the resource instances 1412; the local IP addresses are the internal network addresses of the resource instances 1412 on the provider network 1400. In some embodiments, the provider network 1400 may also provide public IP addresses 1414 and/or public IP address ranges (e.g., Internet Protocol version 4 (IPv4) or Internet Protocol version 6 (IPv6) addresses) that customers may obtain from the provider 1400.

Conventionally, the provider network 1400, via the virtualization services 1410, may allow a customer of the service provider (e.g., a customer that operates one or more client networks 1450A-1450C including one or more customer device(s) 1452) to dynamically associate at least some public IP addresses 1414 assigned or allocated to the customer with particular resource instances 1412 assigned to the customer. The provider network 1400 may also allow the customer to remap a public IP address 1414, previously mapped to one virtualized computing resource instance 1412 allocated to the customer, to another virtualized computing resource instance 1412 that is also allocated to the customer. Using the virtualized computing resource instances 1412 and public IP addresses 1414 provided by the service provider, a customer of the service provider such as the operator of customer network(s) 1450A-1450C may, for example, implement customer-specific applications and present the customer's applications on an intermediate network 1440, such as the Internet. Other network entities 1420 on the intermediate network 1440 may then generate traffic to a destination public IP address 1414 published by the customer network(s) 1450A-1450C; the traffic is routed to the service provider data center, and at the data center is routed, via a network substrate, to the local IP address 1416 of the virtualized computing resource instance 1412 currently mapped to the destination public IP address 1414. Similarly, response traffic from the virtualized computing resource instance 1412 may be routed via the network substrate back onto the intermediate network 1440 to the source entity 1420.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1400; a customer may then assign their allocated public IP addresses to particular resource instances allocated to the customer. These public IP addresses may be referred to as customer public IP addresses, or simply customer IP addresses. Instead of being assigned by the provider network 1400 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 15:
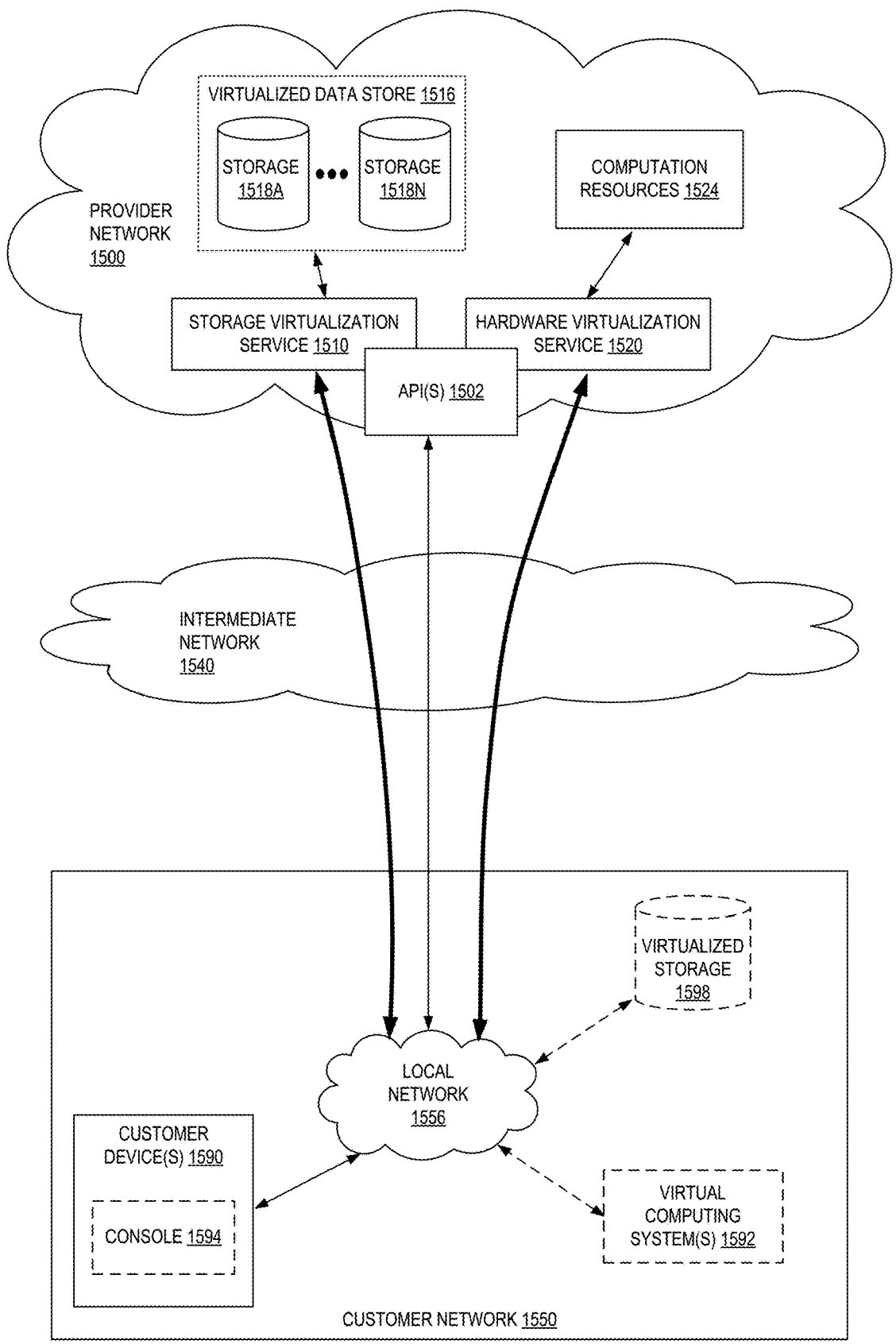
FIG. 15 is a block diagram of an example provider network that provides a storage service and a hardware virtualization service to customers according to some embodiments.

FIG. 15 is a block diagram of an example provider network that provides a storage service and a hardware virtualization service to customers, according to some embodiments. Hardware virtualization service 1520 provides multiple computation resources 1524 (e.g., VMs) to customers. The computation resources 1524 may, for example, be rented or leased to customers of the provider network 1500 (e.g., to a customer that implements customer network 1550). Each computation resource 1524 may be provided with one or more local IP addresses. Provider network 1500 may be configured to route packets from the local IP addresses of the computation resources 1524 to public Internet destinations, and from public Internet sources to the local IP addresses of computation resources 1524.

Provider network 1500 may provide a customer network 1550, for example coupled to intermediate network 1540 via local network 1556, the ability to implement virtual computing systems 1592 via hardware virtualization service 1520 coupled to intermediate network 1540 and to provider network 1500. In some embodiments, hardware virtualization service 1520 may provide one or more APIs 1502, for example a web services interface, via which a customer network 1550 may access functionality provided by the hardware virtualization service 1520, for example via a console 1594 (e.g., a web-based application, standalone application, mobile application, etc.). In some embodiments, at the provider network 1500, each virtual computing system 1592 at customer network 1550 may correspond to a computation resource 1524 that is leased, rented, or otherwise provided to customer network 1550.

From an instance of a virtual computing system 1592 and/or another customer device 1590 (e.g., via console 1594), the customer may access the functionality of storage service 1510, for example via one or more APIs 1502, to access data from and store data to storage resources 1518A-1518N of a virtual data store 1516 (e.g., a folder or "bucket", a virtualized volume, a database, etc.) provided by the provider network 1500. In some embodiments, a virtualized data store gateway (not shown) may be provided at the customer network 1550 that may locally cache at least some data, for example frequently-accessed or critical data, and that may communicate with storage service 1510 via one or more communications channels to upload new or modified data from a local cache so that the primary store of data (virtualized data store 1516) is maintained. In some embodiments, a user, via a virtual computing system 1592 and/or on another customer device 1590, may mount and access virtual data store 1516 volumes via storage service 1510 acting as a storage virtualization service, and these volumes may appear to the user as local (virtualized) storage 1598.

While not shown in FIG. 15, the virtualization service(s) may also be accessed from resource instances within the provider network 1500 via API(s) 1502. For example, a customer, appliance service provider, or other entity may access a virtualization service from within a respective virtual network on the provider network 1500 via an API 1502 to request allocation of one or more resource instances within the virtual network or within another virtual network.

Illustrative System

Figure 16:
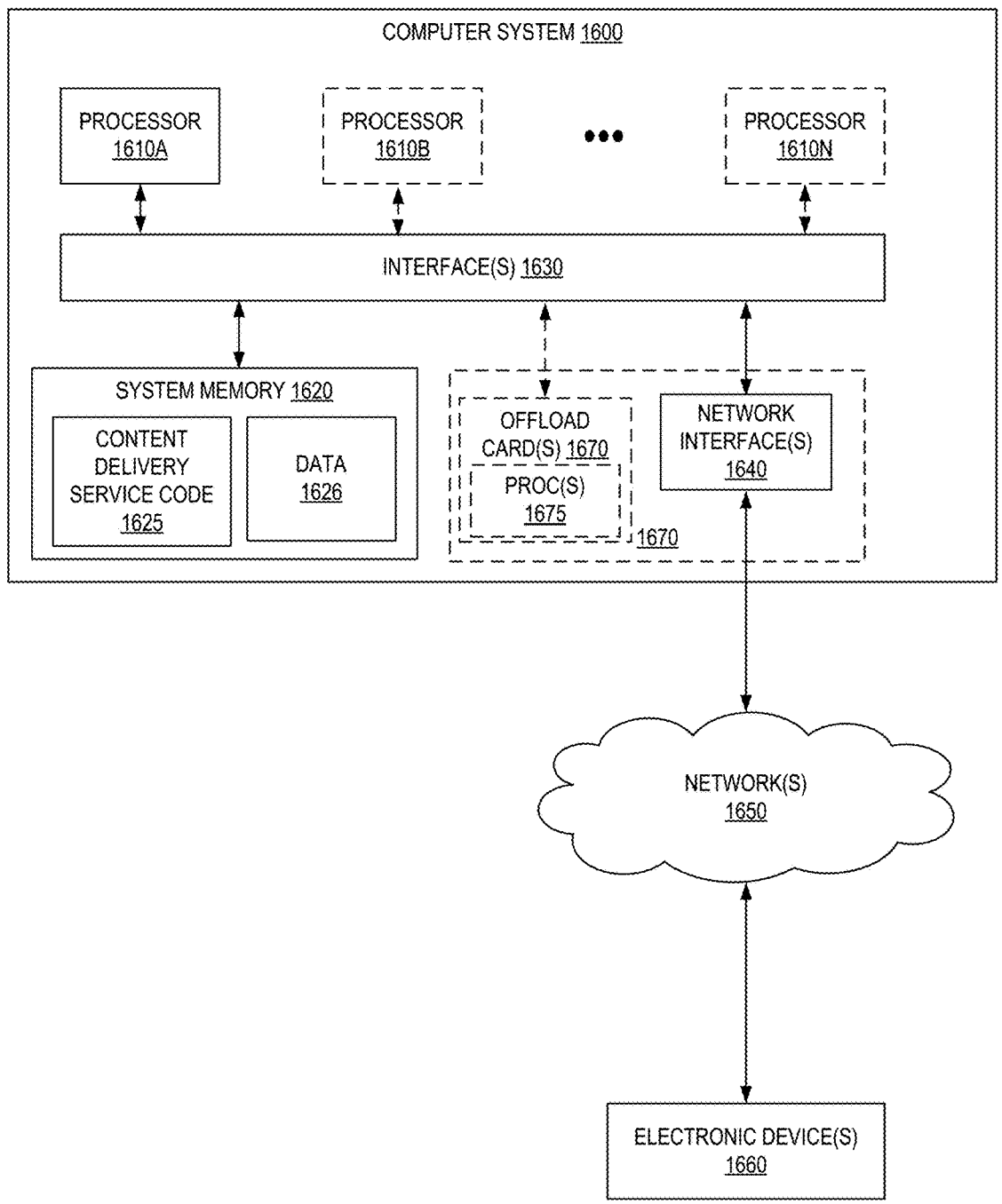
FIG. 16 is a block diagram illustrating an example computer system that may be used in some embodiments.

In some embodiments, a system that implements a portion or all of the techniques for content indexing as described herein may include a general-purpose computer system that includes or is configured to access one or more computer-accessible media, such as computer system 1600 illustrated in FIG. 16. In the illustrated embodiment, computer system 1600 includes one or more processors 1610 coupled to a system memory 1620 via an input/output (I/O) interface 1630. Computer system 1600 further includes a network interface 1640 coupled to I/O interface 1630. While FIG. 16 shows computer system 1600 as a single computing device, in various embodiments a computer system 1600 may include one computing device or any number of computing devices configured to work together as a single computer system 1600.

In various embodiments, computer system 1600 may be a uniprocessor system including one processor 1610, or a multiprocessor system including several processors 1610 (e.g., two, four, eight, or another suitable number). Processors 1610 may be any suitable processors capable of executing instructions. For example, in various embodiments, processors 1610 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1610 may commonly, but not necessarily, implement the same ISA.

System memory 1620 may store instructions and data accessible by processor(s) 1610. In various embodiments, system memory 1620 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1620 as content delivery service code 1625 (e.g., executable to implement, in whole or in part, the content delivery service 1024) and data 1626.

In one embodiment, I/O interface 1630 may be configured to coordinate I/O traffic between processor 1610, system memory 1620, and any peripheral devices in the device, including network interface 1640 or other peripheral interfaces. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computer system 1600 and other devices 1660 attached to a network or networks 1650, such as other computer systems or devices as illustrated in FIG. 1, for example. In various embodiments, network interface 1640 may support communication via any suitable wired or wireless general data networks, such as types of Ethernet network, for example. Additionally, network interface 1640 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1600 includes one or more offload cards 1670 (including one or more processors 1675, and possibly including the one or more network interfaces 1640) that are connected using an I/O interface 1630 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1600 may act as a host electronic device (e.g., operating as part of a hardware virtualization service) that hosts compute instances, and the one or more offload cards 1670 execute a virtualization manager that can manage compute instances that execute on the host electronic device. As an example, in some embodiments the offload card(s) 1670 can perform compute instance management operations such as pausing and/or un-pausing compute instances, launching and/or terminating compute instances, performing memory transfer/copying operations, etc. These management operations may, in some embodiments, be performed by the offload card(s) 1670 in coordination with a hypervisor (e.g., upon a request from a hypervisor) that is executed by the other processors 1610A-1610N of the computer system 1600. However, in some embodiments the virtualization manager implemented by the offload card(s) 1670 can accommodate requests from other entities (e.g., from compute instances themselves), and may not coordinate with (or service) any separate hypervisor.

In some embodiments, system memory 1620 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1600 via I/O interface 1630. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1600 as system memory 1620 or another type of memory. Further, a computer-accessible medium may include transmission media or signals such as electrical, electromagnetic, or digital signals, conveyed via a communication medium such as a network and/or a wireless link, such as may be implemented via network interface 1640.

Figure 17:
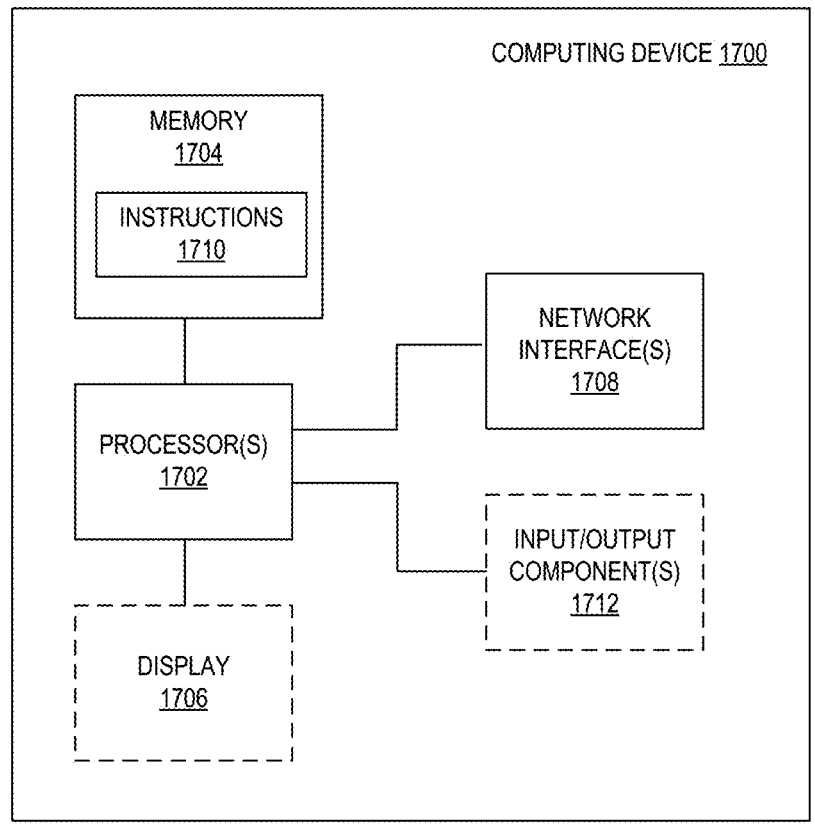
FIG. 17 illustrates a logical arrangement of a set of general components of an exemplary computing device that can be utilized in accordance with various embodiments.

FIG. 17 illustrates a logical arrangement of a set of general components of an example computing device 1700. Generally, a computing device 1700 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1702 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1704) to store code (for example, instructions 1710, e.g., which implement a content delivery service as disclosed herein), and a set of one or more wired or wireless network interfaces 1708 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1704) of a given electronic device typically stores code (e.g., instructions 1710) for execution on the set of one or more processors 1702 of that electronic device. One or more parts of various embodiments may be implemented using different combinations of software, firmware, and/or hardware.

A computing device 1700 can include some type of display element 1706, such as a touch screen or liquid crystal display (LCD), although many devices such as portable media players might convey information via other means, such as through audio speakers, and other types of devices such as server end stations may not have a display element 1706 at all. As discussed, some computing devices used in some embodiments include at least one input and/or output component(s) 1712 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 18:
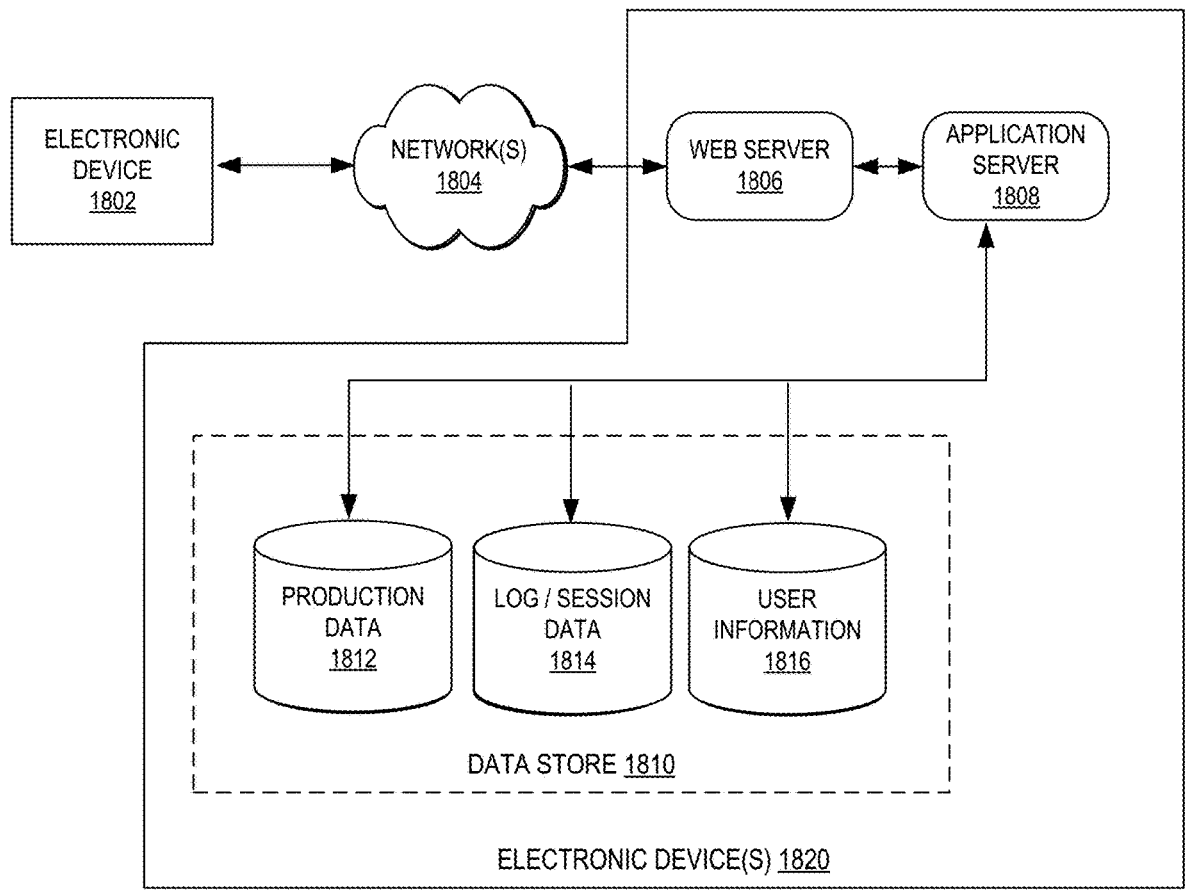
FIG. 18 illustrates an example of an environment for implementing aspects in accordance with various embodiments.

As discussed, different approaches can be implemented in various environments in accordance with the described embodiments. For example, FIG. 18 illustrates an example of an environment 1800 for implementing aspects in accordance with various embodiments. For example, in some embodiments messages are HyperText Transfer Protocol (HTTP) requests that are received by a web server (e.g., web server 1806), and the users, via electronic devices, may interact with the provider network via a web portal provided via the web server 1806 and application server 1808. As will be appreciated, although a web-based environment is used for purposes of explanation, different environments may be used, as appropriate, to implement various embodiments. The system includes an electronic client device 1802, which may also be referred to as a client device and can be any appropriate device operable to send and receive requests, messages or information over an appropriate network 1804 and convey information back to a user of the device 1802. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1804 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1804 includes the Internet, as the environment includes a web server 1806 for receiving requests and serving content in response thereto, although for other networks an alternative device serving a similar purpose could be used, as would be apparent to one of ordinary skill in the art.

The illustrative environment includes at least one application server 1808 and a data store 1810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1808 can include any appropriate hardware and software for integrating with the data store 1810 as needed to execute aspects of one or more applications for the client device 1802 and handling a majority of the data access and business logic for an application. The application server 1808 provides access control services in cooperation with the data store 1810 and is able to generate content such as text, graphics, audio, video, etc., to be transferred to the client device 1802, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1802 and the application server 1808, can be handled by the web server 1806. It should be understood that the web server 1806 and application server 1808 are not required and are merely example components, as structured code discussed herein can be executed on any appropriate device or host machine as discussed elsewhere herein.

The data store 1810 can include several separate data tables, databases, or other data storage mechanisms and media for storing data relating to a particular aspect. For example, the data store illustrated includes mechanisms for storing production data 1812 and user information 1816, which can be used to serve content for the production side. The data store 1810 also is shown to include a mechanism for storing log or session data 1814. It should be understood that there can be many other aspects that may need to be stored in the data store, such as page image information and access rights information, which can be stored in any of the above listed mechanisms as appropriate or in additional mechanisms in the data store 1810. The data store 1810 is operable, through logic associated therewith, to receive instructions from the application server 1808 and obtain, update, or otherwise process data in response thereto. In one example, a user might submit a search request for a certain type of item. In this case, the data store 1810 might access the user information 1816 to verify the identity of the user and can access a production data 1812 to obtain information about items of that type. The information can then be returned to the user, such as in a listing of results on a web page that the user is able to view via a browser on the user device 1802. Information for a particular item of interest can be viewed in a dedicated page or window of the browser.

The web server 1806, application server 1808, and/or data store 1810 may be implemented by one or more electronic devices 1820, which can also be referred to as electronic server devices or server end stations, and may or may not be located in different geographic locations. Each of the one or more electronic devices 1820 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 18. Thus, the depiction of the environment 1800 in FIG. 18 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1518A-1518N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request at a content delivery service to encode a live video at a quality level of a plurality of quality levels of a quality-defined variable bitrate encoding;
   determining features for a frame of the live video;
   generating a first predicted quantization parameter for the frame by a first machine learning model, trained for a first objective quality metric, receiving an input of the features and the quality level;
   performing a real time encode of the live video based at least in part on the first predicted quantization parameter to generate an encoded live video; and
   transmitting the encoded live video to a viewer device.

2. The computer-implemented method of claim 1, further comprising generating a second predicted quantization parameter for the frame by a second machine learning model, trained for a second, different objective quality metric, receiving the input of the features and the quality level, wherein the performing comprises performing the real time encode of the live video based at least in part on the first predicted quantization parameter and the second predicted quantization parameter to generate the encoded live video.

3. The computer-implemented method of claim 1, further comprising:
   generating a second predicted quantization parameter for the frame by a second machine learning model, trained for a second, different objective quality metric, receiving the input of the features and the quality level; and
   determining an aggregated range of predicted quantization parameters based at least in part on the first predicted quantization parameter and the second predicted quantization parameter,
   wherein the performing comprises performing the real time encode of the live video based at least in part on the aggregated range of predicted quantization parameters.

4. A computer-implemented method comprising:
   receiving a request at a content delivery service to encode a video at a quality level of a plurality of quality levels;
   determining features for a frame of the video;
   generating a first predicted quantization parameter for the frame by a first machine learning model, trained for a first quality metric, receiving an input of the features and the quality level;
   performing an encode of the video based at least in part on the first predicted quantization parameter to generate an encoded video; and
   transmitting the encoded video to a viewer device.

5. The computer-implemented method of claim 4, further comprising setting the content delivery service to a uniform quality mode, wherein the generating the first predicted quantization parameter for the frame by the first machine learning model is in response to the setting.

6. The computer-implemented method of claim 5, further comprising:
   displaying, via a graphical user interface to a user of the content delivery service, a query to enter the uniform quality mode;
   receiving an indication from the user via the graphical user interface to enter the uniform quality mode; and
   the setting of the content delivery service to the uniform quality mode is in response to the indication.

7. The computer-implemented method of claim 4, wherein the video is a live video, and the performing the encode is a single encode of the live video between receipt of the live video at the content delivery service and the transmitting the encoded live video to the viewer device.

8. The computer-implemented method of claim 4, further comprising generating a second predicted quantization parameter for the frame by a second machine learning model, trained for a second, different quality metric, receiving the input of the features and the quality level, wherein the performing comprises performing the encode of the video based at least in part on the first predicted quantization parameter and the second predicted quantization parameter to generate the encoded video.

9. The computer-implemented method of claim 4, further comprising:
   generating a second predicted quantization parameter for the frame by a second machine learning model, trained for a second, different quality metric, receiving the input of the features and the quality level; and
   determining an aggregated range of predicted quantization parameters based at least in part on the first predicted quantization parameter and the second predicted quantization parameter,
   wherein the performing comprises performing the encode of the video based at least in part on the aggregated range of predicted quantization parameters.

10. The computer-implemented method of claim 9, further comprising:
    receiving a level of bandwidth reduction; and
    selecting a proper subset of the aggregated range of predicted quantization parameters based at least in part on the level of bandwidth reduction,
    wherein the performing comprises performing the encode of the video based at least in part on the proper subset of the aggregated range of predicted quantization parameters.

11. The computer-implemented method of claim 9, wherein the determining the aggregated range comprises averaging the first predicted quantization parameter and the second predicted quantization parameter based on their confidence levels.

12. The computer-implemented method of claim 4, wherein the generating the first predicted quantization parameter for the frame comprises:
    looping through an input of each of a plurality of candidate quantization parameters into the first machine learning model to output corresponding quality metric values of the first quality metric;
    determining a mapping of a corresponding quality level to the corresponding quality metric values; and selecting the first predicted quantization parameter from the mapping based at least in part on the quality level for encoding the video.

13. The computer-implemented method of claim 4, wherein the first predicted quantization parameter is a multiple parameter proper subset of a plurality of predicted quantization parameters.

14. The computer-implemented method of claim 4, further comprising:
generating a corresponding predicted quantization parameter for each frame of the video in a look ahead buffer of the content delivery service by the first machine learning model receiving a respective input of features of that frame and the quality level,
wherein the performing comprises performing the encode of the video based at least in part on the first predicted quantization parameter and the corresponding predicted quantization parameters to generate the encoded video.

15. A system comprising:
a video intake service implemented by a one or more electronic devices, the video intake service including instructions that upon execution cause the one or more electronic devices to intake a video; and
a content delivery service implemented by a one or more electronic devices, the content delivery service including instructions that upon execution cause the one or more electronic devices to perform operations comprising:
receiving a request at the content delivery service to encode the video at a quality level of a plurality of quality levels,
determining features for a frame of the video,
generating a first predicted quantization parameter for the frame by a first machine learning model, trained for a first quality metric, receiving an input of the features and the quality level,
performing an encode of the video based at least in part on the first predicted quantization parameter to generate an encoded video, and
transmitting the encoded video to a viewer device.

16. The system of claim 15, wherein the instructions upon execution cause the content delivery service to perform operations further comprising setting the content delivery service to a uniform quality mode, wherein the generating the first predicted quantization parameter for the frame by the first machine learning model is in response to the setting.

17. The system of claim 16, wherein the instructions upon execution cause the content delivery service to perform operations further comprising:
displaying, via a graphical user interface to a user of the content delivery service, a query to enter the uniform quality mode;
receiving an indication from the user via the graphical user interface to enter the uniform quality mode; and
the setting of the content delivery service to the uniform quality mode is in response to the indication.

18. The system of claim 15, wherein the instructions upon execution cause the content delivery service to perform operations further comprising generating a second predicted quantization parameter for the frame by a second machine learning model, trained for a second, different quality metric, receiving the input of the features and the quality level, wherein the performing comprises performing the encode of the video based at least in part on the first predicted quantization parameter and the second predicted quantization parameter to generate the encoded video.

19. The system of claim 15, wherein the instructions upon execution cause the content delivery service to perform operations further comprising:
generating a second predicted quantization parameter for the frame by a second machine learning model, trained for a second, different quality metric, receiving the input of the features and the quality level; and
determining an aggregated range of predicted quantization parameters based at least in part on the first predicted quantization parameter and the second predicted quantization parameter,
wherein the performing comprises performing the encode of the video based at least in part on the aggregated range of predicted quantization parameters.

20. The system of claim 15, wherein the instructions upon execution cause the content delivery service to perform operations wherein the generating the first predicted quantization parameter for the frame comprises:
looping through an input of each of a plurality of candidate quantization parameters into the first machine learning model to output corresponding quality metric values of the first quality metric;
determining a mapping of a corresponding quality level to the corresponding quality metric values; and
selecting the first predicted quantization parameter from the mapping based at least in part on the quality level for encoding the video.

* * * * *